US008848984B2

(12) United States Patent
Yager et al.

(10) Patent No.: US 8,848,984 B2

(45) Date of Patent: Sep. 30, 2014

(54) DYNAMIC THRESHOLDS FOR DOCUMENT TAMPER DETECTION

(75) Inventors: Neil Yager, Oxfordshire (GB); Roger David Butler, Abbotsford (AU); Junya Arakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 13/398,414

(22) Filed: Feb. 16, 2012

(65) Prior Publication Data

US 2012/0218284 A1 Aug. 30, 2012

(30) Foreign Application Priority Data

Feb. 25, 2011 (AU) ................................ 2011200831

(51) Int. Cl.
*G06K 9/00* (2006.01)
*G09G 5/00* (2006.01)

(52) U.S. Cl.
CPC ............ *G09G 5/003* (2013.01); *G09G 2340/02* (2013.01); *G09G 2370/16* (2013.01); *G09G 2358/00* (2013.01); *G09G 2370/027* (2013.01)
USPC .......................................................... 382/112

(58) Field of Classification Search
USPC .......................................................... 382/112
See application file for complete search history.

(56) References Cited

U.S. PATENT DOCUMENTS 6,567,530 B1 * 5/2003 Keronen et al. ............... 382/100
6,611,598 B1 8/2003 Hayosh
6,978,036 B2 12/2005 Alattar et al.
2003/0044043 A1 * 3/2003 Kaneda ......................... 382/100
2004/0258276 A1 * 12/2004 Ishii et al. ..................... 382/100
2005/0259297 A1 * 11/2005 Tanaka ......................... 358/3.28
2005/0276439 A1 * 12/2005 Ishii ............................. 382/100
2007/0071283 A1 * 3/2007 Yagishita ...................... 382/100

FOREIGN PATENT DOCUMENTS

WO 2009065151 A2 5/2009

OTHER PUBLICATIONS

Sendur, IEEE Bivariate Shrinkage Function for Wavelet based Denoising Exploiting Interscale Dependency, Nov. 2002.*

* cited by examiner

*Primary Examiner* — Alex Liew
(74) *Attorney, Agent, or Firm* — Canon U.S.A., Inc. IP Division

(57) ABSTRACT

Disclosed is a method (160) for identifying potential tamper in a candidate document having content affected by noise. A candidate content value for each of a plurality of sub-regions of the candidate document and an original content value for each of a plurality of sub-regions of a corresponding original document are determined. The content values are desirably determined based on at least one characteristic of the content in the corresponding sub-region. The candidate content values (330) are associated with the corresponding original content values and a distribution of the candidate content values based on the corresponding original content values is determined. The method characterizes (340) the noise in the candidate document by determining an expected content value range based on the spread of a selected part of the distribution of candidate content values. The method can then identify (350) candidate content values outside the expected content value range as potential tamper.

26 Claims, 22 Drawing Sheets

DYNAMIC THRESHOLDS FOR DOCUMENT TAMPER DETECTION

REFERENCE TO RELATED PATENT APPLICATION

This application claims the benefit under 35 U.S.C. §119 of the filing date of Australian Patent Application No. 2011200831, filed Feb. 25, 2011, hereby incorporated by reference in its entirety as if fully set forth herein.

TECHNICAL FIELD

The present invention relates to document security and, in particular, to selecting one or more noise thresholds for tamper detection.

BACKGROUND

It is often desirable to ensure that a printed document has not been altered or tampered with in some unauthorised manner from the time the document was first printed. For example, a contract that has been agreed upon and signed on a particular date may subsequently be fraudulently altered and it is desirable to be able to detect such alterations in detail. Similarly, security documents of various sorts, such as cheques and other monetary instruments record values which are vulnerable to fraudulent alteration. Detection of any fraudulent alteration in such documents is also desirable. Further, it is desirable that such detection be automated, and that the detection reveals the nature of any alteration.

Various methods of document tamper detection have been proposed and used.

One approach to tamper detection uses watermarks or two-dimensional (2D) barcodes printed on the document to encode information, or a representation, about the contents of the original document. When the document contents are to be verified, the information is extracted from the watermark or 2D barcode and compared to the candidate document. Any changes between the encoded representation of the original document and the candidate document represent possible instances of tamper.

The process of tamper detection is complicated by the fact that a candidate document may have been subject to noise. For example, printing, scanning and handling a document alters its appearance through the introduction of unintended noise. It is desirable for tamper detection system to be robust to noise. In other words, document noise should not be identified as tamper.

Tamper detection systems typically use a noise threshold in order to distinguish noise from tamper. If the difference between the original document and the candidate document in a region is less than the noise threshold, the region is assumed to be free of tamper. However, if the difference between the original document and the candidate document in a region is greater than the noise threshold, the region is presumed to contain tamper.

Various methods for setting noise thresholds have been proposed. A common method is to empirically determine a suitable noise threshold based on experimental data. The noise threshold is then hard coded into the tamper detection system. A disadvantage of this approach is that the threshold has to be set high enough to avoid false tamper detections under a wide range of conditions, thereby necessitating a threshold that misses small instances of true tamper. Furthermore, documents with an unusually high degree of noise are likely to result in a large number of false tamper detections.

Such an approach may satisfactory handle printer and scanner noise, which can usually be reliably modelled, but generally fails to accommodate handling noise and multiple copy generations.

Another common method for selecting a suitable noise threshold is to allow the user to manually adjust the threshold. The user is able to visually estimate the level of noise in a document, and set the noise threshold to a value that minimises the number of false tamper detections. Disadvantages of this approach are that it is subjective and open to abuse. Furthermore, since it requires user input it is not suitable for fully automated workflows.

It is an object of the present invention to substantially overcome, or at least ameliorate, one or more disadvantages of existing arrangements.

SUMMARY

Disclosed is a method for identifying potential tamper in a candidate document having content affected by noise. A candidate content value for each of a plurality of sub-regions of the candidate document and an original content value for each of a plurality of sub-regions of a corresponding original document are determined. The content values are desirably determined based on at least one characteristic of the content in the corresponding sub-region. The candidate content values are associated with the corresponding original content values and a distribution of the candidate content values based on the corresponding original content values is determined. The method characterises the noise in the candidate document by determining an expected content value range based on the spread of a selected part of the distribution of candidate content values. The method can then identify candidate content values outside the expected content value range as potential tamper.

Also disclosed is a computer-implemented method for identifying potential tamper in a candidate document having content affected by noise. This method determines a candidate content value for each of a plurality of sub-regions of the candidate document and an original content value for each of a plurality of sub-regions of a corresponding original document. The candidate and original content values are determined based on at least one characteristic of the content in the respective sub-regions. The method also determines a distribution of the candidate content values by associating the candidate content values with the corresponding original content values and then characterises noise in the candidate document by determining an expected content value range based on the spread of a selected part of the distribution of candidate content values. The method can then identify candidate content values outside the expected content value range as potential tamper.

Generally the candidate document and the original document have a protected region and the protected region is partitioned into tiles and the method is performed upon at least one of the tiles.

The method may further include determining from the distribution upper and lower bounds of candidate content values to define noise thresholds characterising the noise in the candidate document and to establish the expected content value range. The upper and lower bounds may be determined using at least one of a mean and a variance of candidate content values. Further, the upper and lower bounds can be determined using methods that are robust to outlier candidate content values present in the distribution. The bounds may be determined using trimmed mean and trimmed variance of the candidate content values. The bounds may alternately be determined using a probability distribution and through setting noise thresholds on a primary mode of the distribution.

Desirably, the content values are mean pixel intensities of sub-regions of the respective documents. Also the determining of the distribution can group the candidate content values according to one of (i) original content values, (ii) spatial location, and (iii) a division of the protected region into subsections.

Also the upper and lower bounds may be interpolated using regression based on specific upper and lower thresholds identified for corresponding specific original content values. Further, a specific upper threshold and a corresponding specific lower threshold are identified from a probability distribution of candidate content values associated with a corresponding specific original content value.

Preferably, the method further comprises adjusting a sensitivity of the method by at least one of: raising the upper bound and lowering the lower bound; and narrowing a separation between the upper bound and the lower bound.

Advantageously, the at least one characteristic comprises at least one of pixel intensity, pixel centre of mass, pixel intensity gradient, edge features of the document and frequency domain features.

Desirably the method further comprises decoding original content values for the original document from an encoded representation formed on the candidate document. The encoded representation may be a barcode.

The method may further extract information from the candidate document and using the extracted information to query a database to retrieve a representation of an original document associated with the candidate document.

In some implementations, at least one of the upper and lower bounds obtained through regression is non-linear.

The method may further comprises displaying the identified potential tamper in the candidate document on a display screen by displaying the candidate document on the display screen; comparing the original document with the candidate document to determine at least two candidate regions, each determined candidate region including detected tamper of the candidate document; determining a confidence value associated with each determined candidate region, said confidence value defining the likelihood that the detected tamper in each candidate region is true tamper; and displaying on the display screen a representation of the detected tamper overlaid on the displayed candidate document whereby detected tamper in a first candidate region associated with a confidence value higher than that of a second candidate region is displayed different to the detected tamper in the second candidate region. This approach may further include displaying, associated with each representation of the detected tamper, a representation of a magnitude of tamper thereby visually distinguishing the various instances of tamper. Desirably the representation of magnitude comprises displaying a numerical strength indicator adjacent the instance, the numeral representing an order of confidence of the tampers. Alternatively the representation of magnitude comprises varying display of the candidate document at the tamper by varying at least one of colour, colour saturation, shading, flashing, outline, highlight, and background. This implementation may further include associating with the display of the candidate document a user interface permitting user traversal of the displayed candidate document through the instances of tamper. Preferably the user traversal of the tampers is in an order of confidence associated with the individual instances.

In another aspect, disclosed is a computer-implemented method for identifying potential tamper in a candidate document having content affected by noise and a barcode encoding original content values of the content. This method determines a candidate content value for each of a plurality of sub-regions of the candidate document and decoding from the barcode an original content value for each of a plurality of sub-regions of a corresponding original document. The candidate and original content values are determined based on at least one characteristic of the content in the respective sub-regions. This method then identifies potential tamper in at least one of the plurality of sub-regions of the candidate document based on a dynamically adjusted noise threshold, wherein the dynamically adjusted noise threshold for a first original content value is different to the dynamically adjusted noise threshold for a second different content value.

Other aspects, including apparatus by which the methods may be perform, graphical user interfaces which aid in tamper detection, and computer program products for tamper detection, are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Disclosed are arrangements which dynamically adjust noise thresholds in a tamper detection system based on the level of noise in a document. The first step is to measure the amount of noise present in a document. This is accomplished by comparing the contents of the candidate document against the contents of the original document. After the amount of noise in the candidate document has been estimated, the noise thresholds are adjusted accordingly. Differences between the original document and the candidate document that are outside of the noise threshold bounds are labelled as tamper. A system for displaying the determined tamper is also described.

A Tamper Detection System

Figure 1:
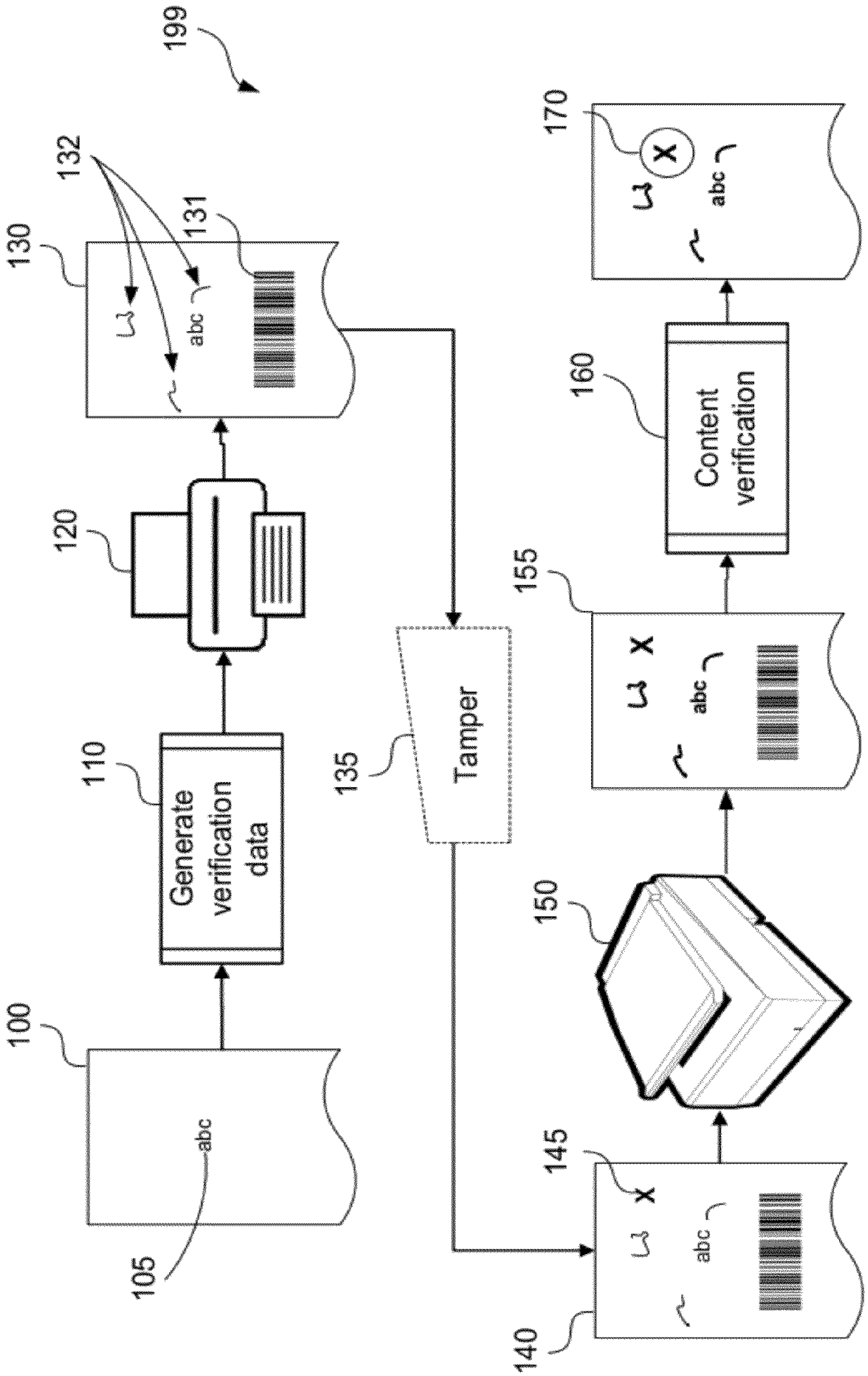
FIG. 1 is a schematic diagram of a tamper detection system according to the present disclosure.

A tamper detection system 199 in which the arrangements to be described may be practiced is illustrated in FIG. 1. The first part of the process involves the creation of a protected document 130 from an original (electronic) document 100 whose original contents 105 are to be protected. A generate verification data process 110 analyses the original document 100, and generates and appends verification data to the document before sending the document with the appended verification data to a printer 120 for hard-copy reproduction. The result is a protected (hard-copy) document 130 that, in this example, has a visible barcode 131 containing the verification data. In alternative implementations, the verification data may be stored or arranged elsewhere. For example, the barcode 131 may be used to encode a reference network location in a network 1220 (to be described) from where the verification data may be retrieved by a verification device. The function of the barcode 131 in this alternative may further be replaced by other encoding, for example a paper fingerprint of the protected document 130, which may be read by scanning and used to encode the reference network location of the verification data.

The protected document 130 is illustrated in FIG. 1 as having several instances of noise 132, which were not present in the original document 100. The noise 132 may have been introduced by the printer 120, or may arise from physically handling the document 130, perhaps over the course of time. If the protected document 130 is tampered with, this being depicted in FIG. 1 as occurring in a tamper step 135, such involves changing the contents 105 of the protected document 130. The result is a candidate document 140, which may or may not contain tamper. In the example of FIG. 1, the candidate document 140 contains a single instance of tamper 145.

To assess the authenticity of the candidate document, the candidate document 140 is converted to an electronic candidate document 155, for example using a scanner 150. The process of scanning a document may introduce additional noise to the electronic candidate document 155. In the example of FIG. 1, scanner gain is seen to have caused the original contents 105, the noise 132, and the tamper 145 to appear darker in the electronic candidate document 155. The collective content of the candidate document 140 is thus affected by noise. It is noted that the noise in this example does influence the tamper. The electronic candidate document 155 is used as input to a content verification process 160. The content verification process 160 detects the tamper 145, and ignores the noise 132. Furthermore, the content verification step 160 indicates the tampered region 170, which, if required, can be displayed to a user.

Although depicted in FIG. 1 as occurring between printing and scanning, the tamper 135 can occur at one or more other stages in the tamper detection system 199. One example includes digitally tampering with the electronic (scanned) representation of the candidate document 155. Specific implementations of the tamper detection system 199 will now be discussed in further detail.

Physical Implementation

Figure 12A:
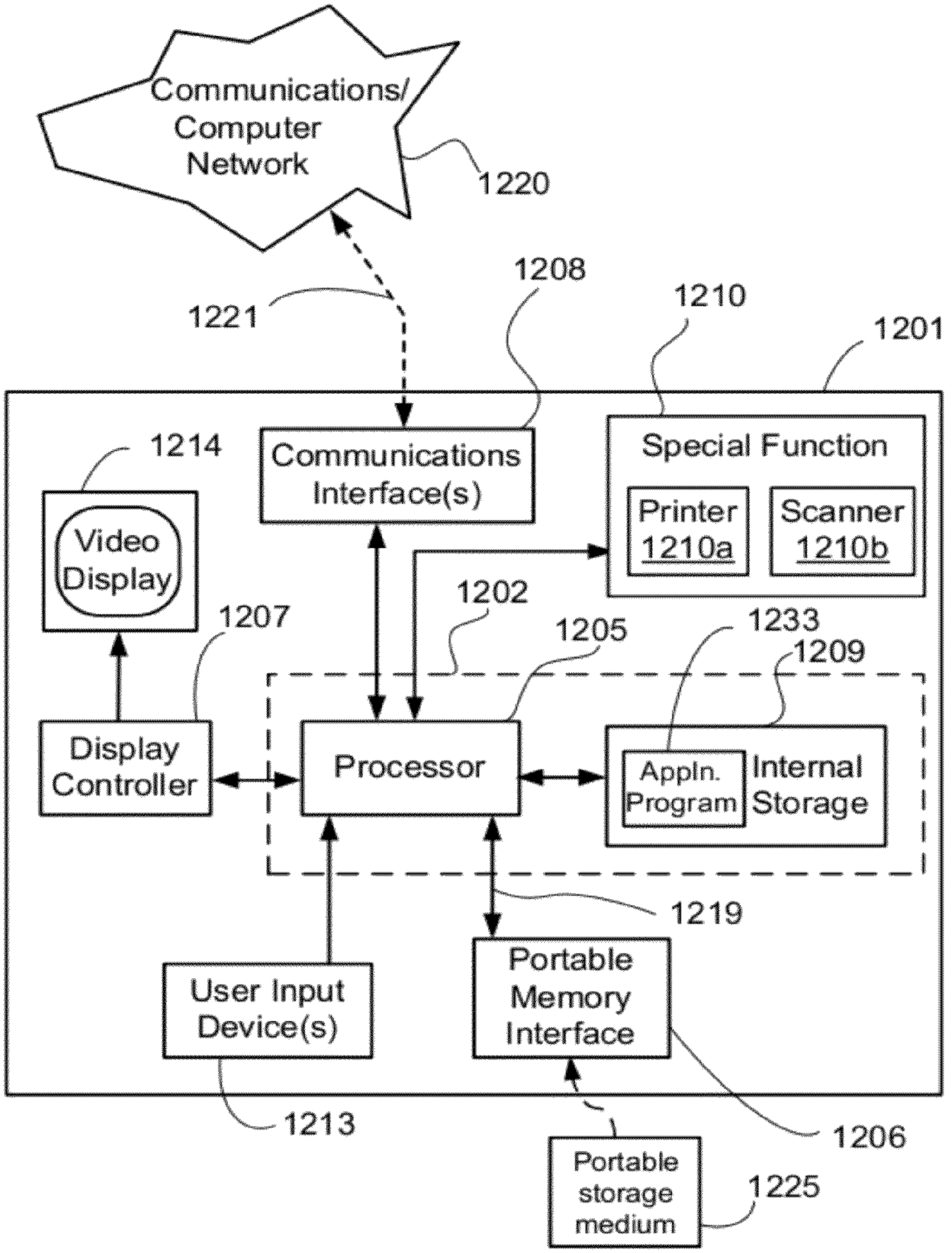
FIGS. 12A and 12B form a schematic block diagram representation of an electronic device upon which the described arrangements can be practiced.
Figure 12B:
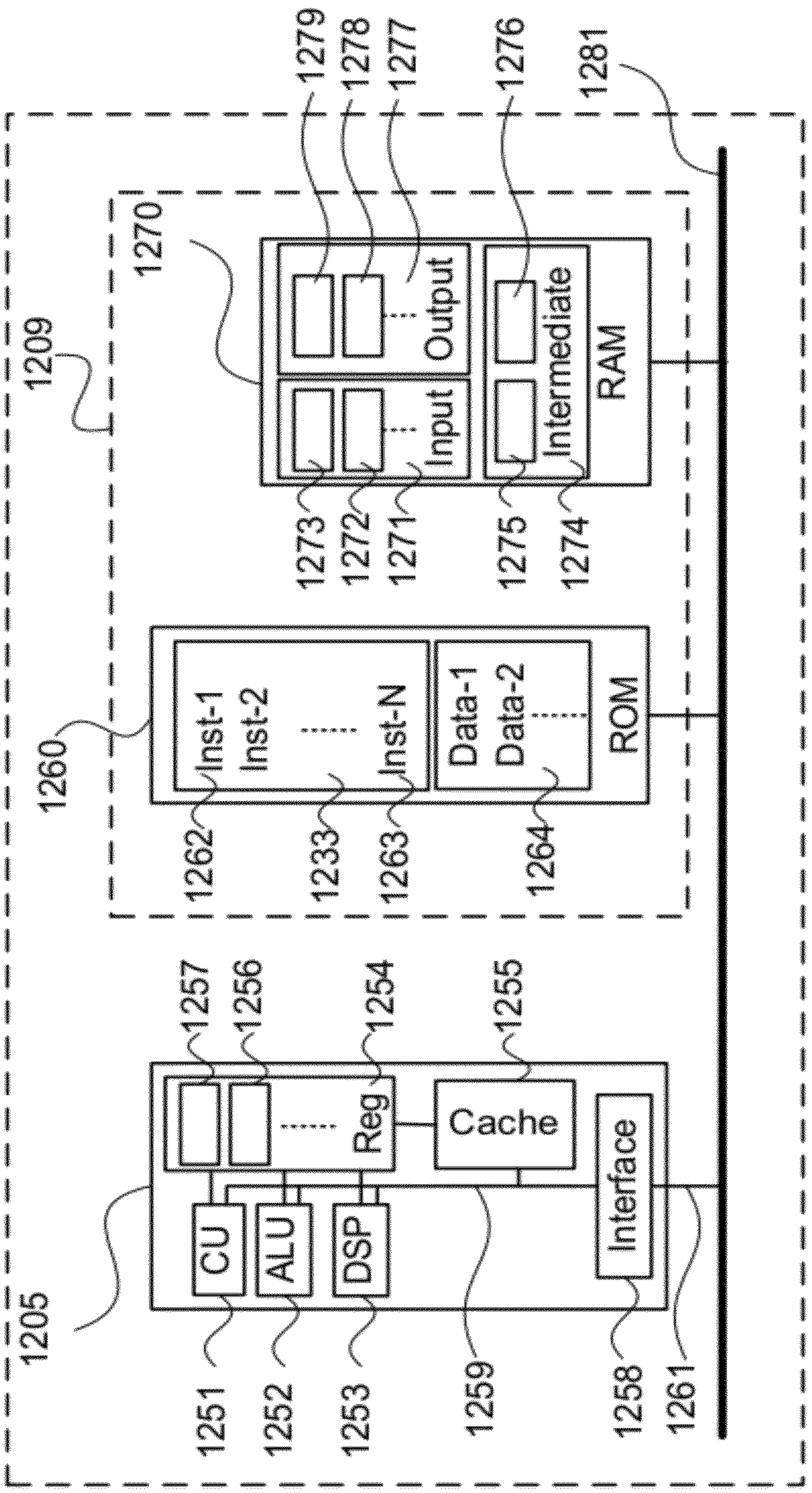

FIGS. 12A and 12B collectively form a schematic block diagram of a general purpose electronic device 1201 comprising embedded components, upon which the methods to be described may be desirably practiced in a computer-implemented fashion. In the example of FIGS. 12A and 12B, the electronic device 1201 is a multi-function printer including a scanning function and may thus provide the functionality of the printer 120 and/or the scanner 150 illustrated in FIG. 1. Alternatively, the electronic device 1201 may be, for example, a standalone scanner, mobile phone, a portable media player or a digital camera, in which processing resources are limited. Nevertheless, the methods to be described below may also be performed on higher-level devices such as desktop computers, server computers, and other such devices with significantly larger processing resources.

As seen in FIG. 12A, the electronic device 1201 comprises an embedded controller 102. Accordingly, the electronic device 1201 may be referred to as an "embedded device." In the present example, the controller 1202 comprises a processing unit (or processor) 105 which is bi-directionally coupled to an internal storage module 1209. The storage module 1209 may be formed from non-volatile semiconductor read only memory (ROM) 1260 and semiconductor random access memory (RAM) 1270, as seen in FIG. 12B. The RAM 1270 may be volatile, non-volatile or a combination of volatile and non-volatile memory.

The electronic device 1201 comprises a display controller 1207, which is connected to a display 1214, such as a liquid crystal display (LCD) panel or the like. The display controller 1207 is configured for displaying graphical images on the display 1214 in accordance with instructions received from the processor 1205.

The electronic device 1201 also comprises user input devices 1213 typically formed by keys, a keypad or like controls. In some implementations, the user input devices 1213 may include a touch sensitive panel physically associated with the display 1214 to form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 12A, the electronic device 1201 also comprises a portable memory interface 1206, which is coupled to the processor 1205 via a connection 1219. The portable memory interface 1206 allows a complementary portable memory device 1225 to be coupled to the electronic device 1201 to act as a source or destination of data or to supplement the internal storage module 1209. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 1201 also comprises a communications interface 1208 to permit coupling of the device 1201 to a computer or communications network 1220 via a connection 1221. The connection 1221 may be wired or wireless. For example, the connection 1221 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 1201 is configured to perform some special function. The embedded controller 1202, possibly in conjunction with further special function components 1210, is provided to perform that special function. In the described example the electronic device 1201 is a multi-function printer/scanner and the special function components 1210 may include a scanner 1210*b*, for example having a scanning unit, a corona wire, a discharge lamp and a photoreceptor drum assembly (not illustrated), and a printer 1210*a*, for example having a paper transport mechanism and print mechanism. Using the printer 1210*a*, the protected document 130 may be formed from commands and data issued by the processor 1205, and using the scanner 1210*b*, the candidate document 155 may be created and supplied to the processor 1205 for verification. As another example, where the device 1201 is a digital camera, the components 1210 may represent a lens, focus control and image sensor of the camera, by which an image of the document 140 may be captured and treated as the candidate document 155. As another example, the device 1201 may be a mobile telephone handset. In this instance, the components 1210 may include those components required for communications in a cellular telephone environment as well as the scanner 1210*b*.

The methods described below may be implemented using the embedded controller 1202 wherein the processes of FIGS. 2 to 11 and 13 to 24, to be described, may be implemented as one or more software application programs 1233 executable within the embedded controller 1202.

The electronic device 1201 is an effective and advantageous apparatus for implementing the described methods. In particular, with reference to FIG. 12B, the steps of the described methods are effected by instructions in the software 1233 that are carried out within the controller 1202. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 1233 is generally loaded into the controller 1202 from a computer readable medium, and is then typically stored in the ROM 1260 of the internal storage module 1209, as illustrated in FIG. 12A, after which the software 1233 can be executed by the processor 1205. The computer readable medium may be a non-transitory computer-readable storage medium such as the portable storage medium 1225 upon which the software 1233 is recorded, or a transitory computer readable transmission medium such as the network 1220 from which the software 1233 may be downloaded. In some instances, the processor 1205 may execute software instructions that are located in non-transitory media such as the RAM 1270. Software instructions may be located in RAM 1270 by the processor 1205 initiating a copy of one or more code modules from ROM 1260 into RAM 1270. Alternatively, the software instructions of one or more code modules may be pre-installed in a non-volatile region of RAM 1270 by a manufacturer. After one or more code modules have been located in RAM 1270, the processor 1205 may execute software instructions of the one or more code modules.

As described herein, the application program 1233 is typically pre-installed and stored in the ROM 1260 by a manufacturer, prior to distribution of the electronic device 1201. However, in some instances, the application programs 1233 may be supplied to the user encoded on one or more CD-ROM (not shown) and read via the portable memory interface 1206 prior to storage in the internal storage module 1209 or in the portable memory 1225. In another alternative, the software application program 1233 may be read by the processor 1205 from the network 1220 or loaded into the controller 1202 or the portable storage medium 1225 from other computer readable media. Computer readable storage media refers to any storage medium that participates in providing instructions and/or data to the controller 1202 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 1201. Examples of computer readable transmission media that may also participate in the provision of software, application programs, instructions and/or data to the device 1201 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 1233 and the corresponding code modules mentioned above may be executed to implement one or more graphical user interfaces (GUIs) to be rendered or otherwise represented upon the display 1214. Through manipulation of the user input device 1213 (e.g., the keypad), a user of the device 1201 and the application programs 1233 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 12B is a detailed schematic block diagram of the controller 1202 comprising the processor 1205 for executing the application programs 1233, and the internal storage 1209. The internal storage 1209 comprises read only memory (ROM) 1260 and random access memory (RAM) 1270. The processor 1205 is able to execute the application programs 1233 stored in one or both of the connected memories 1260 and 1270. When the electronic device 1202 is initially powered up, a system program resident in the ROM 1260 is executed. The application program 1233 permanently stored in the ROM 1260 is sometimes referred to as "firmware". Execution of the firmware by the processor 1205 may fulfil various functions, including processor management, memory management, device management, storage management and user interface.

The processor 1205 typically includes a number of functional modules including a control unit (CU) 1251, an arithmetic logic unit (ALU) 1252 and a local or internal memory comprising a set of registers 1254 typically containing atomic data elements 1256, 1257, along with internal buffer or cache memory 1255. One or more internal buses 1259 interconnect these functional modules. The processor 1205 typically also has one or more interfaces 1258 for communicating with external devices via system bus 1281, using a connection 1261.

The application program 1233 includes a sequence of instructions 1262 through 1263 that may include conditional branch and loop instructions. The program 1233 may also include data used in execution of the program 1233. This data may be stored as part of the instruction or in a separate location 1264 within the ROM 1260 or RAM 1270.

In general, the processor 1205 is given a set of instructions, which are executed therein. This set of instructions may be organised into blocks, which perform specific tasks or handle specific events that occur in the electronic device 1201. Typically, the application program 1233 will wait for events and subsequently execute the block of code associated with that event. Events may be triggered in response to input from a user, via the user input devices 1213, as detected by the processor 1205. Events may also be triggered in response to other sensors and interfaces in the electronic device 1201.

The execution of a set of the instructions may require numeric variables to be read and modified. Such numeric variables are stored in the RAM 1270. The disclosed method uses input variables 1271 that are stored in known locations 1272, 1273 in the memory 1270. The input variables are processed to produce output variables 1277 that are stored in known locations 1278, 1279 in the memory 1270. Intermediate variables 1274 may be stored in additional memory locations in locations 1275, 1276 of the memory 1270. Alternatively, some intermediate variables may only exist in the registers 1254 of the processor 1205.

The execution of a sequence of instructions is achieved in the processor 1205 by repeated application of a fetch-execute cycle. The control unit 1251 of the processor 1205 maintains a register called the program counter, which contains the address in ROM 1260 or RAM 1270 of the next instruction to be executed. At the start of the fetch execute cycle, the contents of the memory address indexed by the program counter is loaded into the control unit 1251. The instruction thus loaded controls the subsequent operation of the processor 1205, causing, for example, data to be loaded from ROM memory 1260 into processor registers 1254, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 1233, and is performed by repeated execution of a fetch-execute cycle in the processor 1205 or similar programmatic operation of other independent processor blocks in the electronic device 1201.

Generating Verification Data

Figure 2:
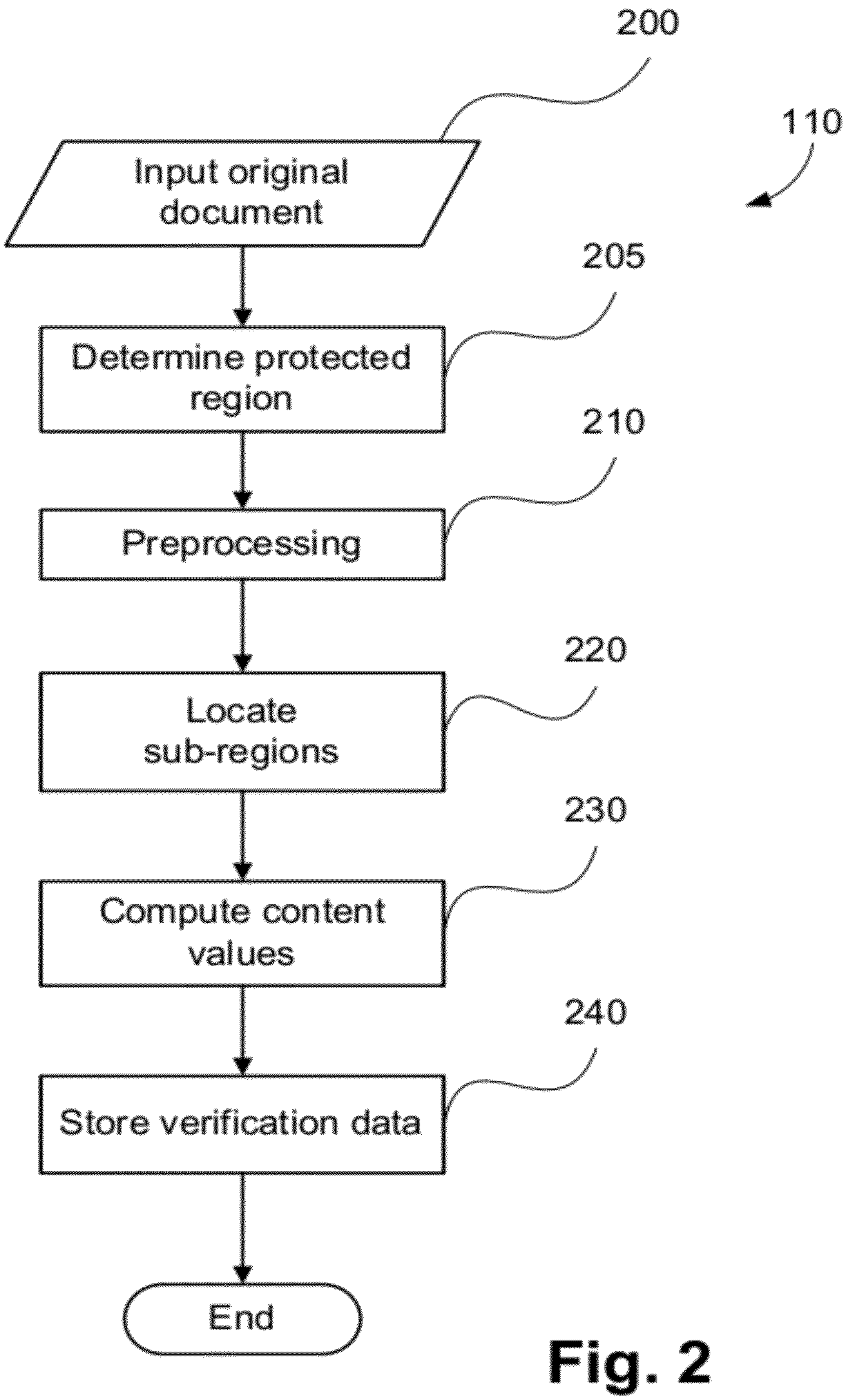
FIG. 2 is a schematic flow diagram illustrating a method of generating verification data useful in the system of FIG. 1.

FIG. 2 contains a flowchart for the method 110 of generating verification data. The method 110 is typically implemented in software as a component of the application program 1233 discussed above and stored within the device 1201 and executable by the processor 1205. The process 110 commences with an input original document step 200, which accepts an electronic image of the original document 100. In some cases the document will natively be in an electronic form, such as a PDF or word processing document and for example provided to the device 1201 for printing from the network 1220. In the case of a tangible (hard-copy) document, an electronic version of such can be obtained using the scanner 1210*b*, or captured in some other manner such as digital photography on a camera or mobile phone as discussed above.

A determine protected region step 205 is then executed by the processor 1205 to establish the area of the original document 100 that is to be protected. In some implementations the entire document page is to be protected, although other implementations may restrict protection to a particular region of interest. The protected region can be determined based on user input or automated page analysis techniques. A protected region can be defined in several ways, such as by the coordinates of a bounding box.

Optionally, a pre-processing step 210 can be carried out on the input image to reduce the impact of noise. It will be appreciated that such pre-processing may involve processes such as histogram equalization, low-pass filtering, edge detection and enhancement, etc.

A locate sub-regions step 220 is then executed to partition the document page 100 into sub-regions. For example, the electronic document 100 may be partitioned into a grid of tiles, with each tile representing a sub-region. For example, each tile may be 30 pixels by 30 pixels in size.

A compute content values step 230 is then executed to calculate a content value for each sub-region. A content value is a compact summary of the sub-region's contents. An example of a content value is the mean intensity of all of the pixels belonging to the sub-region. Alternative content values include higher-order moments of the pixel intensities (e.g. variance or centre of mass), gradients, edge-based features, frequency domain features, etc. The content values may be quantised to a discrete set of values in order to allow a more compact representation. For example, assume that the mean intensity of pixel intensities for a sub-region is computed as a 64-bit floating point number. This value may then be quantised to a 5-bit integer in the range of 0 . . . 31. In another implementation, content values may be sampled from the pixel intensities of a downsampled version of the original document 100.

The set of all content values is included in the verification data. The verification data can also include other information, such as the location of the protected region, a time stamp, the document author, etc. In a store verification data step 240 the verification data is stored for reference during the content verification process 160. In one embodiment, the verification data is added to the protected document 130 in the form of a barcode 131. Alternatively, the verification data can be stored as an invisible watermark, externally in a database as mentioned above, or stored in a magnetic strip that is affixed to the document. The verification data may be compressed using either lossy or lossless compression in order to reduce its size. Furthermore, the verification data may be encrypted or digitally signed in order to increase the security of the tamper detection system. Also, the verification data may be encoded using error correcting codes in order to compensate for barcode degradation.

The Content Verification Process

Figure 3:
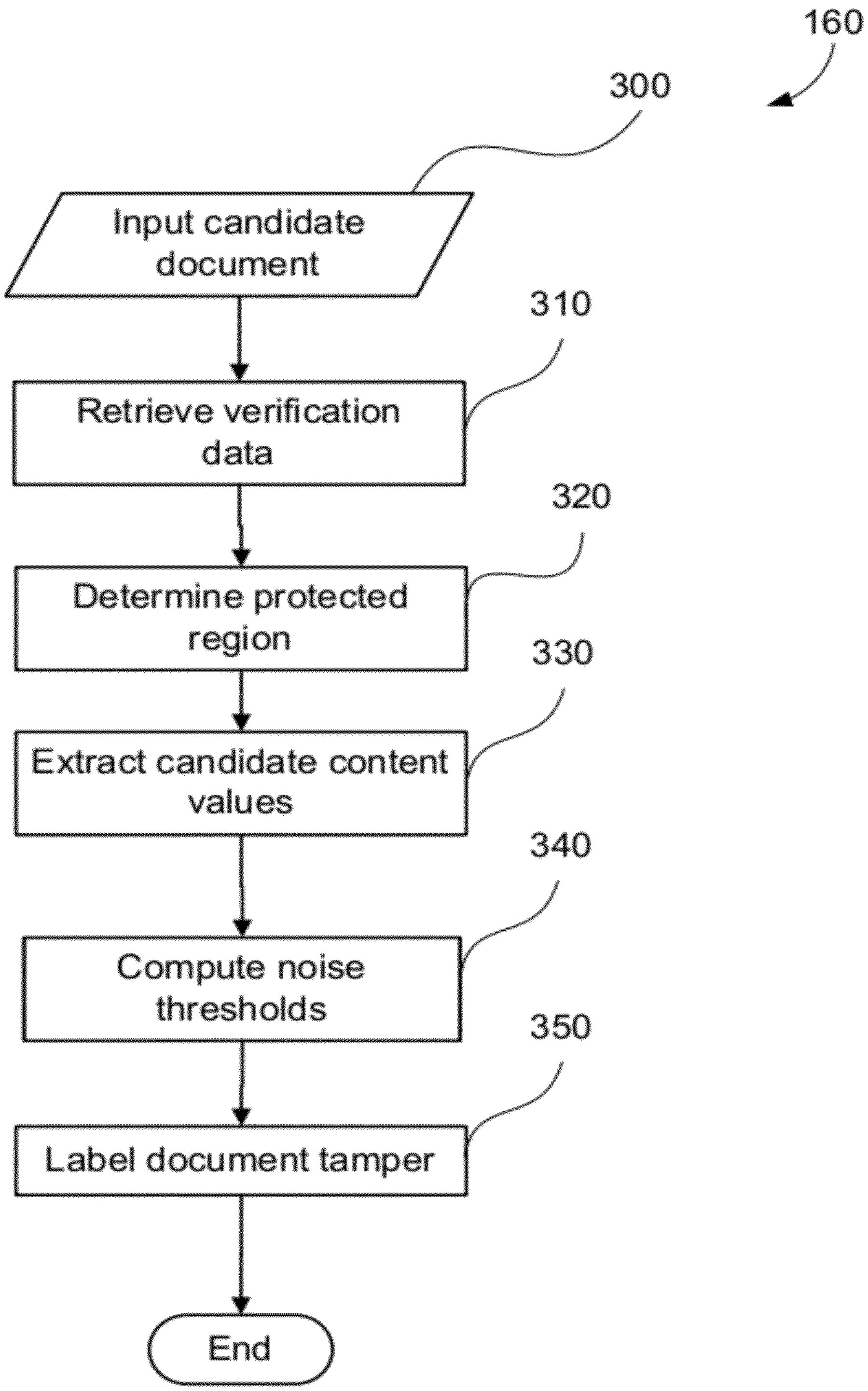
FIG. 3 is a schematic flow diagram illustrating a method of content verification useful in the system of FIG. 1.

FIG. 3 contains a flowchart for a method 160 of the content verification process. Again, the method 160 is desirably implemented in software as part of the application 1233 and stored within the device 1201 and executable by the processor 1205. The method 160 commences with an input candidate document step 300, which accepts an electronic image of the candidate document 155. This step 300 is typically consequential to the scanning of the document 140 and involves retrieving the scanned image from the memory 1209 for processing. A retrieve verification data step 310 is then performed by the processor 1205 to extract the verification data from the candidate document image 155, in the example where the verification data is encoded into the candidate document. In the example of FIG. 1, the verification data is extracted from the barcode 131 on the electronic candidate document 155. Alternatively, the verification data can be retrieved from a database as discussed above.

A determine protected region step 320 is then executed to locate those one or more areas of the electronic candidate document 155 that have been protected. This may be the entire page, or it may be determined using information stored in the verification data. Where the verification data is not conveyed directly on the candidate document 155, this may be performed by way of an agreed protocol associated with information retrieved from a database.

An extract candidate content values step 330 is then applied to the electronic candidate document 155. The protected region of the candidate document is initially partitioned into sub-regions such that each candidate sub-region corresponds to an original sub-region. The extract candidate content values step 330 then via execution in the processor 1205 computes a candidate content value for each of the candidate sub-regions. This is generally the same process as the one used for the generate verification data step 230 that was applied to the original document 100. However, in the step 330 there may be no requirement to quantise or compress the candidate content values.

A compute noise thresholds step 340 is then performed by which a model of the document noise is used to set the values of noise thresholds. In one implementation, the noise thresholds are upper and lower bounds for acceptable candidate content values as a function of the corresponding original content values. A detailed implementation of the compute noise thresholds step 340 is provided in the next section.

The final step of the content verification method 160 is a label document tamper step 350. After noise thresholds have been computed in step 340, each candidate sub-region is labelled by the processor 1205 as either containing tamper or not containing tamper. The candidate sub-regions whose candidate content value falls within the noise thresholds are labelled as non-tamper, and those that fall outside the noise thresholds are labelled as tamper.

The results of the content verification process 160 can be displayed to a user by mapping the candidate sub-region labels back to the document, and displaying the results on a display device, such as the display 1214. For example, sub-regions that have been labelled as tamper may be identified by red marks overlaid on a representation of the candidate document, and this result is displayed on the display panel 1214 of the multi-function printer 1201. The prominence of the tamper indication on the display 1214 can be varied to indicate the magnitude or confidence of the tamper detection, as described in detail below. Such processing may also find application in photocopying, whereby content verification may be performed during the photocopying process by which an authenticity representation may be displayed on a display panel of the photocopier on completion of copying, substantially in real time.

Computing the Noise Thresholds

Figure 4A:
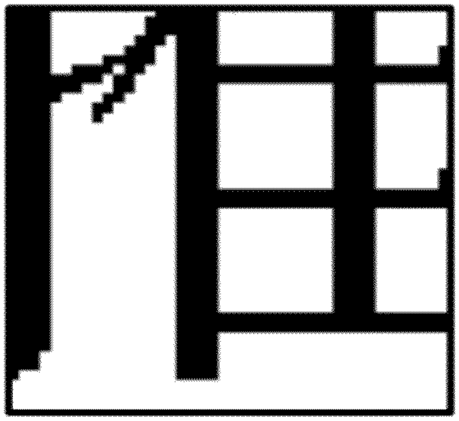
FIG. 4A is an example of an original sub-region.
Figure 4B:
FIG. 4B is an example of a candidate sub-region that has not been tampered.
Figure 4C:
FIG. 4C is an example of a candidate sub-region that has been tampered.

There are two primary reasons why original content values may not exactly match their corresponding candidate content values. The first reason is tamper and the second reason is document noise. Tamper can be defined as the deliberate alteration of contents of a document in such a way that the tamper impacts the document's semantics. Tamper can involve adding content, removing content, or changing existing content. Most other changes to a document can be categorised as noise. The printing process is one of the main sources of noise, and can introduce gamma or contrast changes, colour gamut changes, toner splatter, halftoning, banding, dot noise or dot loss, and many other unintended artefacts. Scanning a physical document is another source of noise, and it can lead to blurring and warping of the document. Furthermore, in some cases the addition of distributed barcodes or watermarks will contribute to document noise. Finally, handling a physical document can introduce noise in the form of smudges, creases and dirt. Automated distinguishing between deliberate tamper and unintentional noise is a challenging problem. FIGS. 4A to 4C illustrate the difference between noise and tamper. FIG. 4A is an original sub-region containing a portion of a Kanji character. FIG. 4B is a corresponding candidate sub-region. In this case, dot gain has caused the strokes of the character to become thicker, and some artefacts have been introduced. FIG. 4C contains an example of what the candidate sub-region might look like if subject to tampering. In this case, several strokes of the character have been removed, thereby changing the meaning of the resulting character.

Figure 5A:
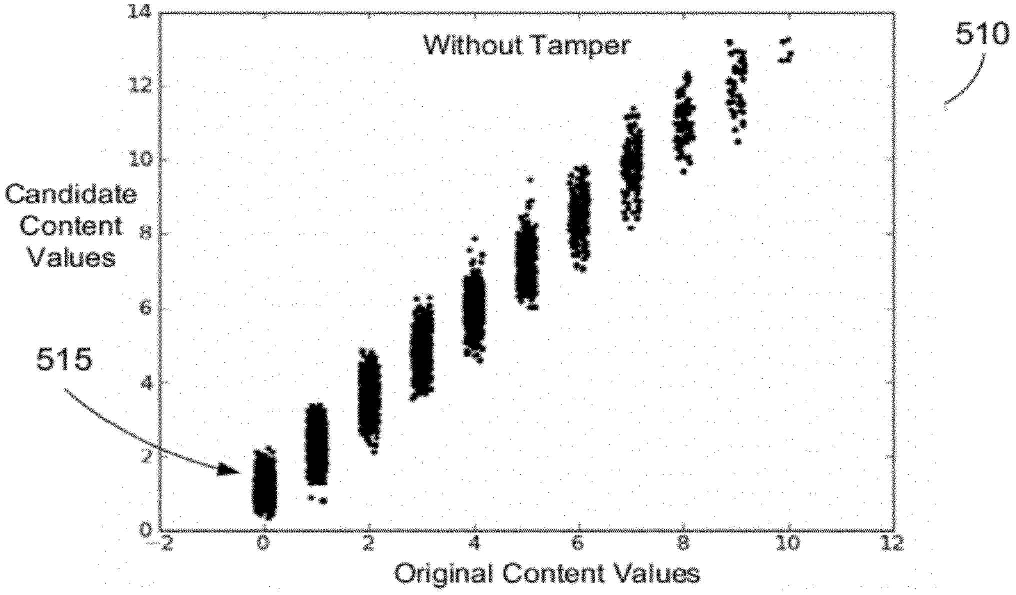
FIG. 5A is a plot of original content values against candidate content values for a document that does not contain tamper.

At the compute noise thresholds step 340, each sub-region of the candidate document has both an original content value and a candidate content value. In one implementation, sub-regions with the same original content values are grouped together for noise threshold processing, regardless of their spatial location on the document. The intuition behind this is that noise will have a similar impact on sub-regions with the same original content value, regardless of their location. FIG. 5A contains a plot 510 of original content values and candidate content values for a document that does not contain tamper. Each point in the plot represents a single sub-region, with its original content value on the x-axis and the candidate content value on the y-axis. The original content values are quantised to 11 values, ranging from 0 to 10 inclusive. A small random x-offset has been added to each x-axis value in order to help distinguish the points in the plot (otherwise they would fall in a line at the integer values). The candidate content values are on the y-axis, and have not been quantised.

Consider the sub-regions 515. This is the set of sub-regions that have an original content value of 0. Despite the fact that all of the sub-regions had the same original content value, the candidate content values have a distribution and range from about 0.5 to about 2.1. The primary reason that there is a range of candidate content values, even in the absence of tamper, is that noise adds a certain level of randomness into the system. However, in general there is a clear relationship between the original content values and the candidate content values. In the absence of tamper, the relationship between the original content values and the candidate content values can be modelled as:

$$\text{Candidate content value}=f(\text{Original content value})+\text{noise}$$

where $f$ is the transfer function of the tamper detection system 199. A tamper detection system transfer function maps an original content value to a candidate content value. In the case of the plot 510, the function $f$ between the original content values and the candidate content values appears to be a linear function. However, in general, the transfer function can take any form.

Figure 5B:
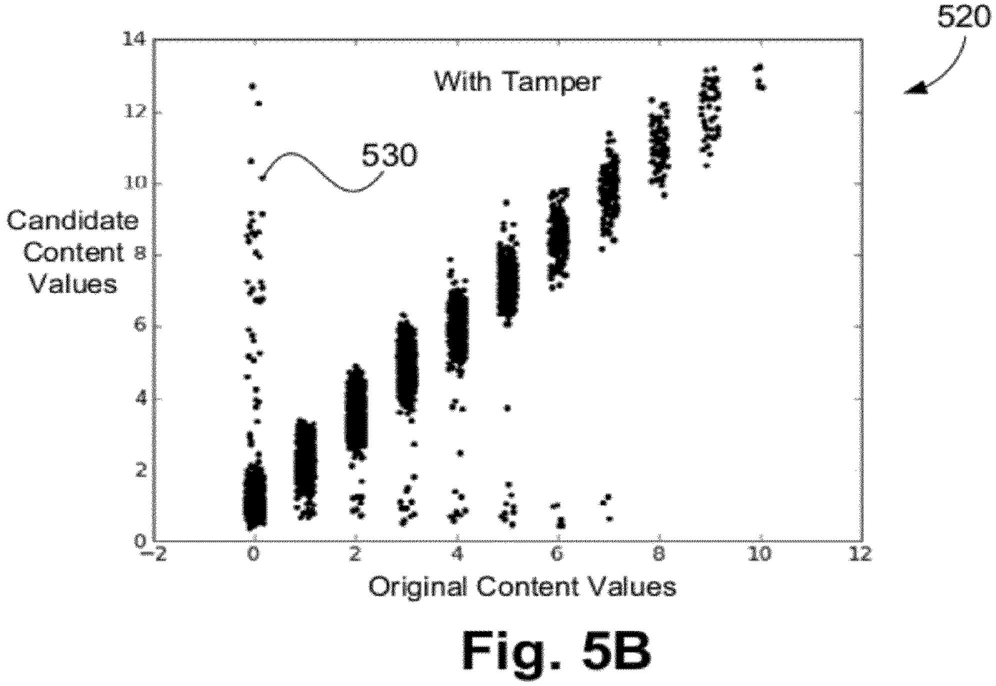
FIG. 5B is a plot of original content values against candidate content values for a document that does contain tamper.

FIG. 5B contains a plot 520 of original content values and candidate content values for a document that does contain tamper. In this case, the distributed relationship between the original content values and candidate content values is more complicated. In particular, there are some sub-regions whose candidate content value is very different from its original content value. For example, consider the sub-region 530. In this case, the original content value is 0, and the candidate content value is 10.1. Noise in document systems tends to act upon sub-regions in a consistent manner, and can therefore be estimated and modelled. Such is typical for printer and scanner noise. Handling noise often occurs near edges (finger smudges) and as lines (from folds), which may also be modelled. On the other hand, sub-regions that have been altered by tampering (e.g. the tamper step 135) have candidate content values that are largely independent of their original content values, and therefore exhibit themselves as outliers in plots of the transfer function of the tamper detection system. Therefore, the problem of tamper detection can be framed as the problem of outlier detection.

Figure 6:
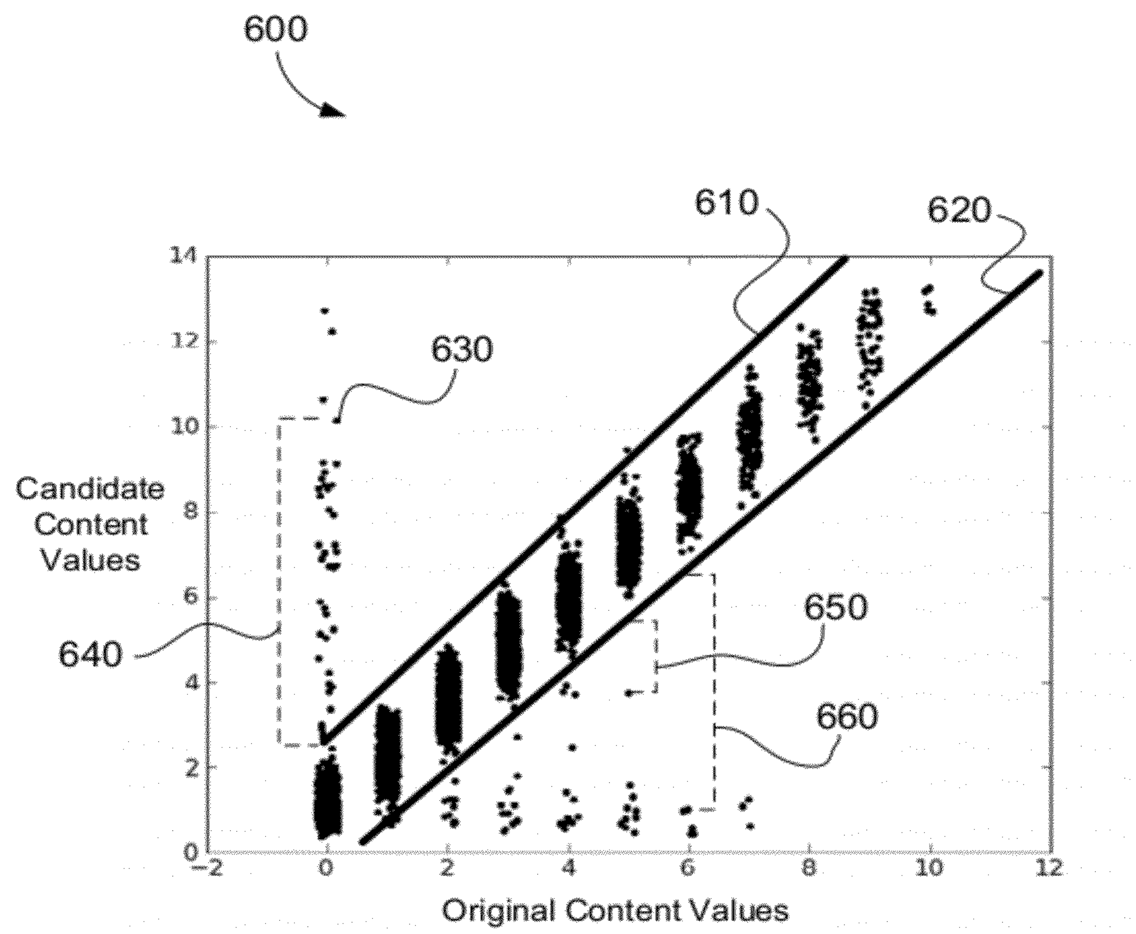
FIG. 6 is a plot of original content values against candidate content values that includes upper and lower bounds.

Outlier detection may be addressed using statistical approaches. In one implementation of the step 340, the noise thresholds are established as upper and lower bounds that contain most of the variation due to noise, and exclude large discrepancies that are most likely due to tamper. In FIG. 6, an upper bound 610 and a lower bound 620 have been added to the plot 600 (which replicates data from the plot 520). The majority of the sub-regions fall inside or between the bounds, and can thus be labelled as non-tamper. However, for a selected part of the distribution, for example at original candidate content value of 0, a corresponding sub-region 630 falls outside of the bounds 610 and 620 and is therefore labelled as tamper. Therefore this approach characterises the noise in the candidate document by determining an expected content value range based on the spread of a selected part of the candidate content value distribution. The spread or separation between the bounds 610 and 620 is therefore determinative of the likelihood of detection of potential tamper and permits the identifying of candidate content values outside the expected content value range as potential tamper.

The distance between the upper bound and the lower bound should be wide enough to account for document noise, but narrow enough to exclude tamper. Therefore, the optimal positions of the upper and lower bounds are a function of both noise and tamper. However, in an operational tamper detection system, it is not known in advance whether or not tamper is present in a given document. Therefore, the upper and lower bounds are computed based on an estimate of the level of noise in a document. Thus the noise thresholds are dynamically adjusted for each document to be verified.

Figure 7A:
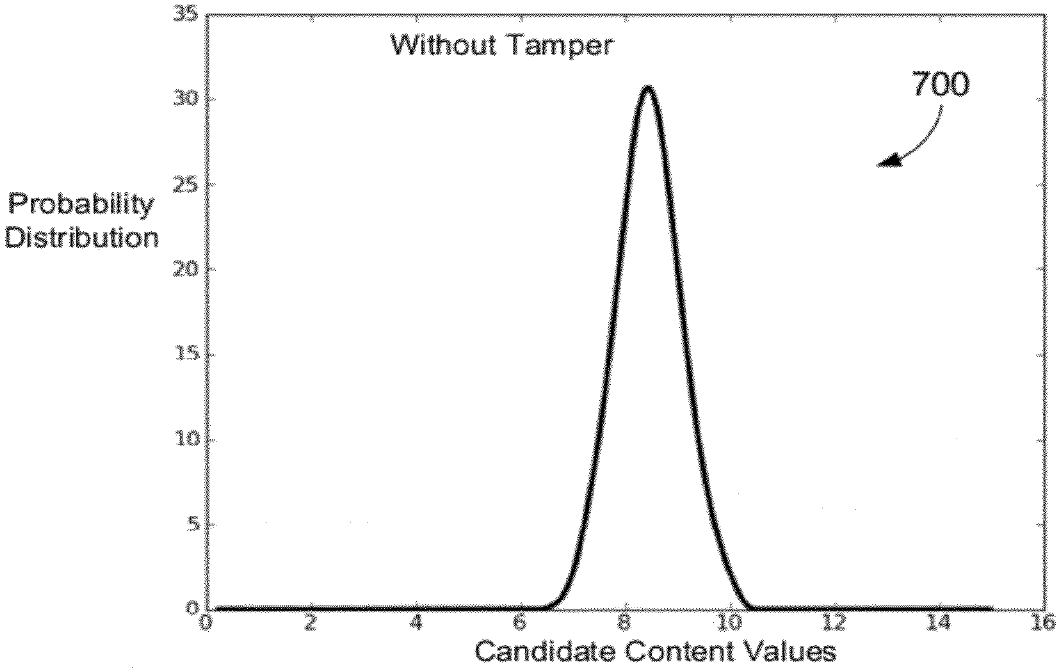
FIG. 7A is a probability distribution of candidate content values for sub-regions with the same original content value for a document with no tamper.
Figure 7B:
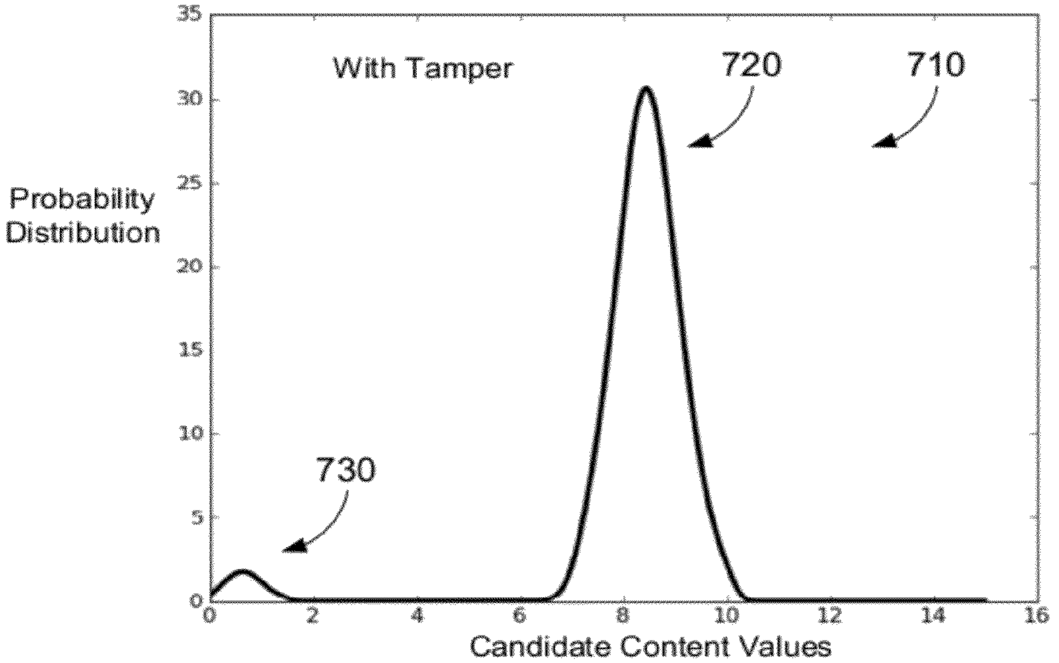
FIG. 7B is a probability distribution of candidate content values for sub-regions with the same original content value for a document with tamper.

In one implementation, the level of noise in a document is estimated by examining the distribution of candidate content values for each original content value. FIG. 7A contains a probability distribution 700 of candidate content values for the sub-regions in the plot 510 of FIG. 5A with an original content value of 6. In this case there is no tamper present. The peak of the probability distribution 700 is located at a candidate value of 8.5, and most candidate values are in the range of 7.0 to 10.0 Therefore, candidate values of 7.0 and 10.0 would be suitable for lower and upper bounds respectively for sub-regions with an original content value of 6. FIG. 7B contains a probability distribution 710 of candidate content values for the sub-regions in plot 520 with an original content value of 6. In this case there is tamper present. The probability distribution 710 is bimodal, with a primary mode 720 and a secondary mode 730. The secondary mode 730 is due to tamper. A lower bound of 7.0 and an upper bound of 10.0, as assessed above, would be suitable because they contain the primary mode 720, and they exclude the secondary mode 730 which is due to tamper.

A straightforward approach to computing suitable upper and lower bounds is based on the mean and standard deviation of a candidate content value probability distribution. The bounds can be defined to be:

$$\text{Lower bound}=\text{mean}-\lambda^*(\text{standard deviation})$$

$$\text{Upper bound}=\text{mean}+\lambda^*(\text{standard deviation})$$

where $\lambda$ is a variable that adjusts the system sensitivity to noise, and thus the extent to which the system generates false positive and false negative detections. The standard deviation can be considered to be a measure of noise, so this approach will allow the noise thresholds to vary dynamically based on the level of noise in a document. However, there is a significant disadvantage to this approach. In particular, the computation of the mean and standard deviation of a probability distribution is very sensitive to outliers. Therefore, when tamper is present, the upper and lower bounds computed using this method can be unreliable.

Figure 8:
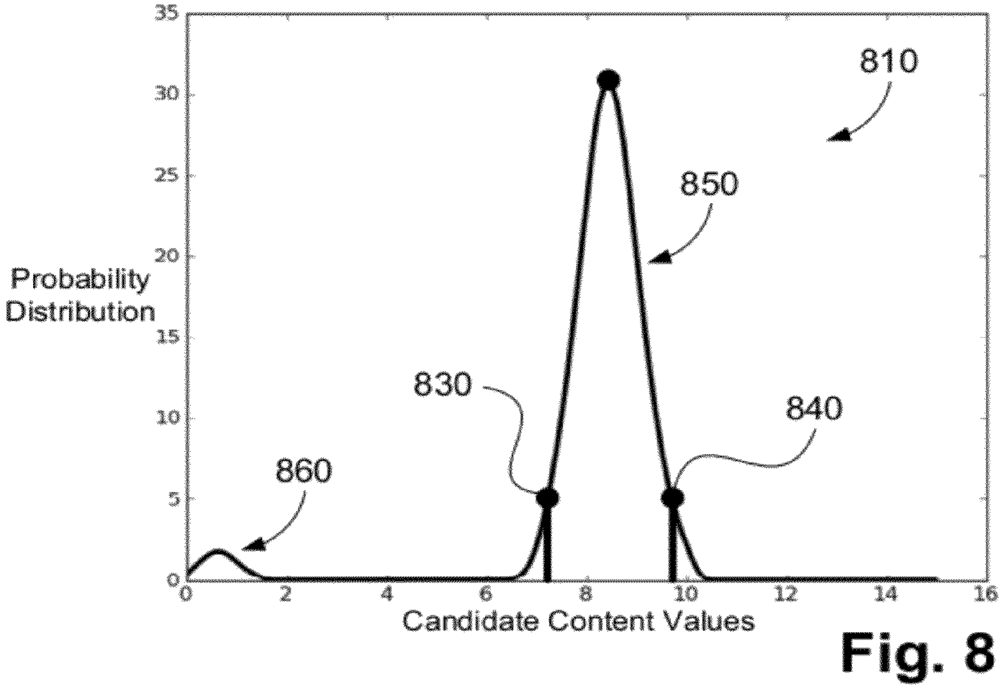
FIG. 8 is an illustration of a method for computing upper and lower bounds for tamper detection thresholds.

In general, it is desirable that the upper and lower bounds are computed using a method that is robust to the presence of outliers. One such approach is illustrated in FIG. 8. FIG. 8 shows a bimodal probability distribution 810, with a primary mode 850 that corresponds to sub-regions that have not been tampered, and a secondary mode 860 that corresponds to sub-regions that have been tampered. The distribution may be multimodal with a primary mode and multiple secondary (tamper) modes. There is typically one distribution 810 for each original content value.

One method to find tight upper and lower bounds around the non-tamper mode of the distribution is as follows. Firstly, the highest peak 820 of the distribution 810 is located. It is assumed that this peak corresponds to non-tamper sub-regions. This is a reasonable assumption because in most cases the number of tamper sub-regions on a single document will be very small compared to the number of non-tamper sub-regions. (However, it should be kept in mind that even a small amount of tamper can radically change the semantics of a document.) Secondly, the distribution is traced in both directions from the peak 820 until the probability value falls below a given set threshold. For example, if the given threshold is 5, a lower bound 830 and an upper bound 840 are found, indicative of the spread of the primary mode of the distribution 810.

The distance between the lower bound 830 and upper bound 840, being a measure of the spread, is a reflection of the amount of noise present in a document. For a noisy document, there will be a wide range of candidate content values for sub-regions of a given original content value. This leads to an increased width of the main mode of the corresponding probability distribution, and consequently a greater distance between the upper and lower bounds. On the other hand, for a document with little noise, the main mode will be narrow, and the upper and lower bounds will be closer together.

The upper and lower bounds can also be found using trimmed mean and trimmed variance, or other robust statistical techniques.

Figure 9:
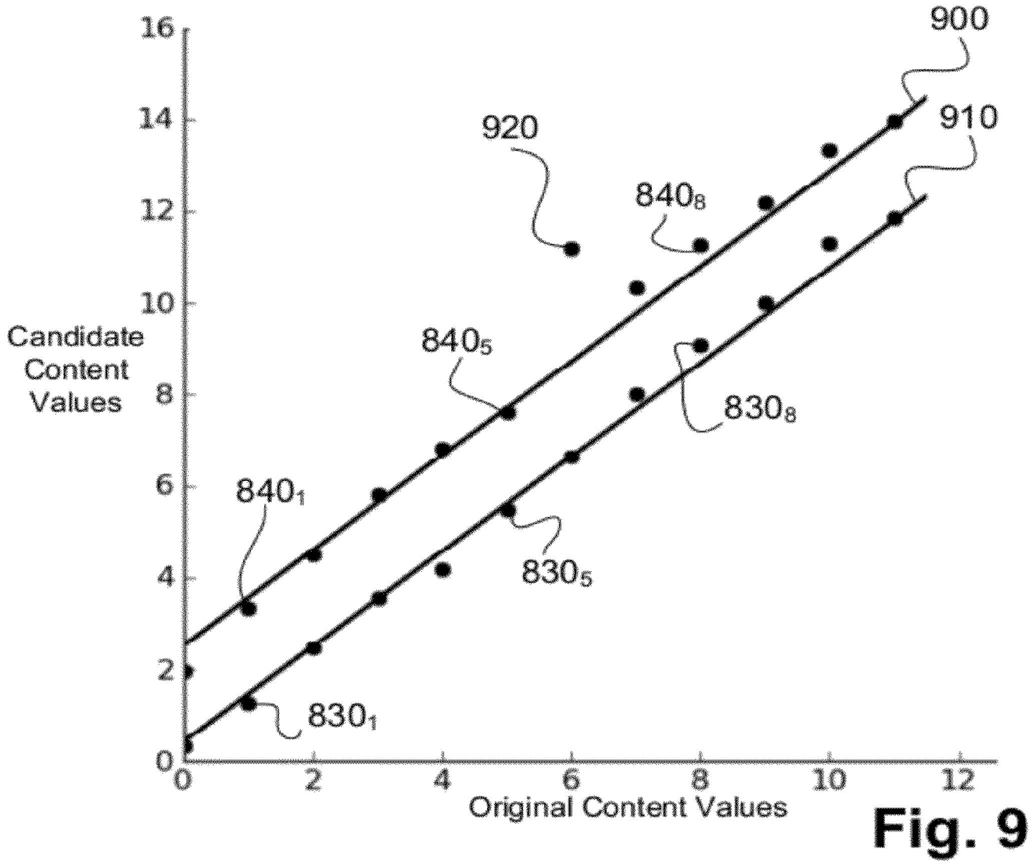
FIG. 9 is an illustration of using regression to refine the upper and lower bounds.

The methods for finding upper and lower bounds outlined so far are based entirely on the candidate content values for a single original content value. The system 199 can be made more robust by using information from a range of original content values. For example, it is possible that there are very few sample candidate content values for a particular original content value. In this case, it is possible to use information from other original content values to interpolate suitable upper and lower bounds. In one implementation, regression is used to refine the upper and lower bound estimates for each original encoded value. FIG. 9 contains an example of the results of regression giving an upper bound 900 and a lower bound 910 by which document noise may be characterised, based on specific thresholds identified in FIG. 8 and discussed above. For each original content value there are two dots: one for the upper bound $\mathbf{840}_i$ and one for the lower bound $\mathbf{830}_i$, where i for this example is an integer between 0 and 11. For example, the bound 920 is the upper bound for candidate content sub-regions with an original content sub-region of 6. In this case, the bound 920 is not consistent with the other bounds, as it is well beyond the upper bound 900, and is therefore unreliable.

Regression has been used to find linear upper and lower bound functions defining the bounds 900 and 910. The upper bound 900 and lower bound 910 do not interpolate each individual upper and lower bound value exactly. However, the interpolated values are expected to be more robust. The net effect of the approaches of FIGS. 8 and 9 is that noise can be accommodated for each original content value through the individual modal distributions of FIG. 8, which are then, through regression, refined to define practical and useful upper and lower bound functions 900 and 910. This, as seen in FIG. 9, may result in some initial bounds estimates (e.g. 920 and $\mathbf{840}_8$) being ultimately placed outside of the bounds 900 and 910, whereas other initial bound estimates (e.g. $\mathbf{830}_8$) being ultimately placed inside of the bounds 900 and 910. The bounds 900 and 910 are computed globally based on all initial bound estimates, are so are expected to be more robust to natural document variation arising from noise.

Figure 24:
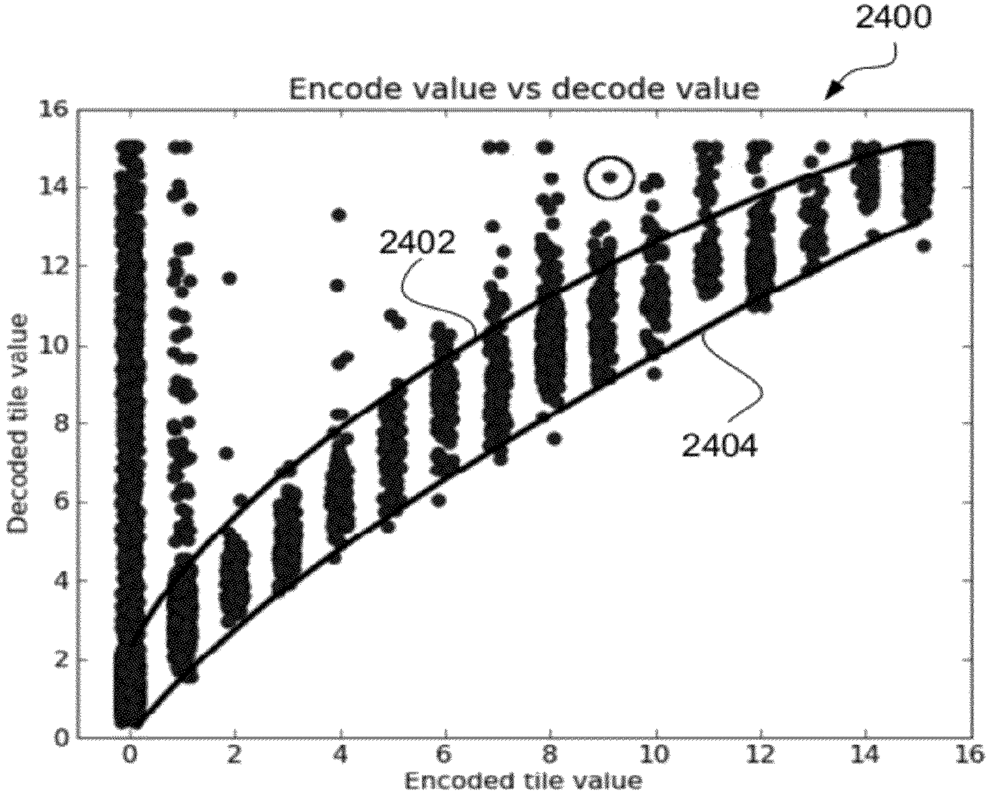
FIG. 24 illustrates non-linear threshold bounds.

Several approaches to regression are known in the art, such as least squares regression and regression splines. The example given in FIG. 9 has fit a linear function to the upper and lower bound points. In general, it is considered best practice to use a regression model of the least complexity that adequately explains the data. It has been observed by the present inventors that low-order polynomials (e.g. linear or quadratic functions) are suitable for modelling the relationship between original content values and candidate content values in a tamper detection system. However, in some circumstances, more expressive (higher-order) models may be desirable. FIG. 24 illustrates a distribution 2400 of original (encoded) content (tile) values plotted against candidate (decoded) content (tile) values where the upper and lower bounds 2402 and 2404 are non-linear and of differing functions, as the upper bound 2402 is seen to be more curved than the lower bound 2404.

Setting the System Sensitivity

In any classification system, there is an inherent trade-off between false positives and false negatives. In the context of tamper detection systems, a false positive occurs when a candidate sub-region is labelled as tamper when no tamper has occurred. A false negative occurs when a true instance of tamper is not detected. The false positive rate can always be reduced at the expense of the false negative rate, and vice versa. For example, it is always possible to achieve a false negative rate of 0% by classifying all sub-regions as being tampered. However, in this case the false positive rate will be unacceptably high.

A tamper detection system can be biased towards minimizing the false positive rate or minimizing the false negative rate. A system that is biased towards a low false negative rate can be considered conservative or sensitive, because its emphasis is to not miss any tamper. On the other hand, a system biased towards a low false positive rate can be considered convenient or user-friendly, because they are less likely to alert users to false tamper. An appropriate balance between false positives and false negatives depends on the intended use for a tamper detection system, and is largely a business decision.

The trade-off between false positives and false negatives can be adjusted through a system sensitivity adjustment. The system sensitivity adjustment can be implemented in a number of different ways. In one example, the system sensitivity is altered by adjusting the noise thresholds. For example, by lowering the lower bound 830 and raising the upper bound 840 by a constant amount, the system is less likely to falsely label a sub-region as tamper, thereby lowering the expected false positive rate. Similarly, by narrowing the separation between the lower bound 830 and the upper bound 840, it is possible to reduce the system's expected false negative rate. Therefore, the system sensitivity adjustment in this example is a small offset that is either added or subtracted to the candidate content value upper and lower bounds.

First Alternative Implementation

An alternate implementation will now be outlined. In this implementation, the sub-regions are found by partitioning a document into tiles, with each tile corresponding to a sub-region. The content value for each sub-region is defined to be the average pixel intensity of the sub-region. The verification data derived therefrom may again be stored or otherwise encoded in a barcode that is printed on the protected document.

During the content verification step, the verification data is retrieved from barcode. Next, the candidate content values are computed for the protected region of the candidate document, and the correspondences between the original sub-regions and the candidate sub-regions are found.

Figure 10:
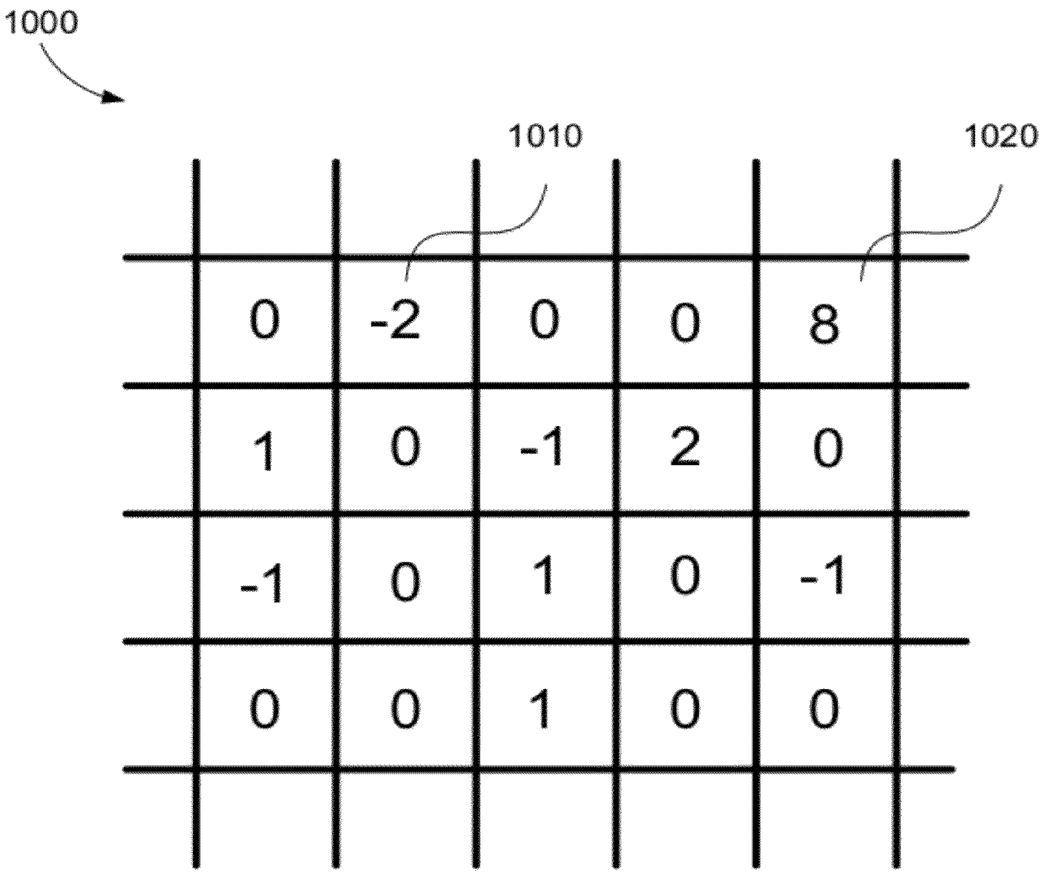
FIG. 10 is an illustration of a 2-dimensional array of differences between original content values and candidate content values.

In this implementation, the noise thresholds are computed based on the range of content values spatially across the candidate document. The first step in computing the noise threshold is to compute the difference between the original content value and the candidate content value for each sub-region. These difference values are stored in a 2-dimensional array 1000, as illustrated in FIG. 10, typically implemented within the memory 1270 in the intermediate area 1274. In FIG. 10, for example, the difference value in the sub-region 1010 indicates that candidate content value for the corresponding sub-region is 2 less than the originally encoded content value. As seen, most of the difference values in the 2-dimensional array 1000 are in the range from −2 to 2. It can be assumed that these relatively small differences are due to random noise. However, the tile 1020 has a difference value of 8, which significant and is unlikely to be due to noise. This value is therefore an outlier, and the corresponding sub-region is likely to have been tampered.

In order to compute the noise thresholds, processing is performed by which a surface is fitted to the 2-dimensional array 1000 of difference values, preferably using regression. In order to ensure that the surface is not sensitive to outliers, the RANSAC algorithm is used. RANSAC is an abbreviation for "RANdomSAmple Consensus", and is an iterative regression algorithm that offers some robustness to outliers. The RANSAC algorithm partitions the data set (i.e. the set of difference values) into "inliers" and "outliers", and the surface is fitted to the inlier set. These two sets may be used directly to identify tamper. Alternatively, and more preferably, it is desirable to accommodate noise, as in previous embodiments, by establishing suitable upper and lower bounds. The fitted surface can be a plane, or a higher dimension polynomial surface, such as a quadratic or cubic. After the surface has been computed, the variance of the difference values (either globally or locally) can be used to estimate upper and lower bound surfaces. Any difference values that fall outside of these bounds, being the outlier set indicate likely tamper. The bounds can be adjusted by a constant amount in order to alter the sensitivity of the system to tamper.

Second Alternative Implementation

Figure 11:
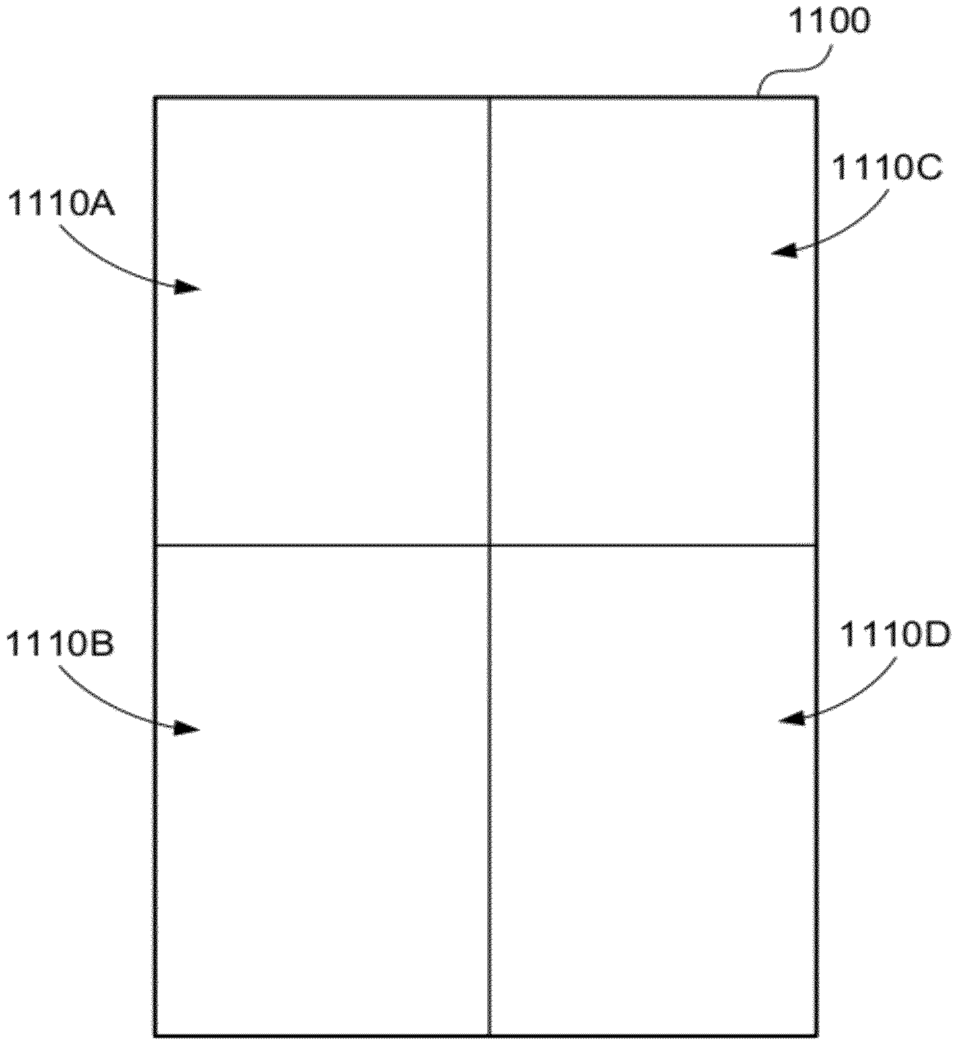
FIG. 11 is an illustration of dividing a protected region into subsections.

In a second alternative implementation, the protected region of the candidate document is divided into subsections. In FIG. 11 for example, a protected region 1110 is divided into the four equally sized subsections 1110A, 1110B, 1110C, and 1110D. In many actual cases of tamper, the tamper is confined to a relatively small area of the document. Therefore, it is unlikely that all of the divisions of the subsections 1110A, 1110B, 1110C, and 1110D will contain tamper. Upper and lower bounds are found for each subsection independently, and are based on the mean and variance of the candidate content values corresponding to each original content value, as in the implementation of FIGS. 2 to 9 which applied to the entire protected region. The upper and lower bounds from the subsection with the tightest (smallest range of) bounds are then used as the bounds for the entire protected region 1100. For example, if the upper and lower bounds computed for subsection 1110A are the tightest, these bounds are used for the entire protected region 1110. The motivation behind this implementation is that at least one of the subsections is likely to be free of tamper, and therefore its upper and lower bounds will be computed based on noise alone, and thus be the tightest. Consequently, these bounds will be very good at excluding candidate content values that are a result of tamper when applied to all subsections.

Method of Displaying Tamper

Methods of displaying the results of a tamper authentication process are described below. These methods ameliorate the problems of communicating the results of a tamper authentication process to the user of a device with limited display capability. Examples of such devices include photocopiers and multifunction printers and portable scanners. The described methods rank the results of tamper authentication in order to present the indications of tamper most likely to correspond with true detections more prominently than indications that are likely to be false detections.

Figure 13:
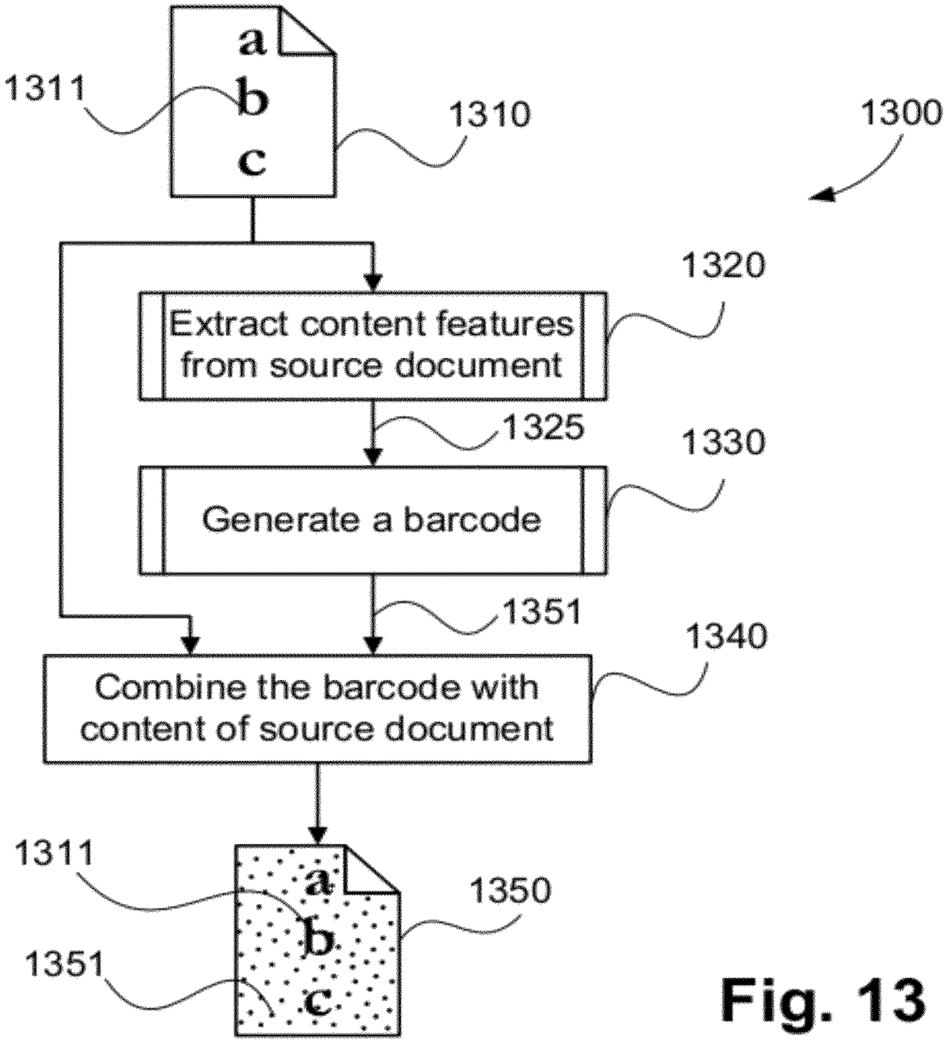
FIG. 13 is a schematic flow diagram showing a method of encoding a source document in order to generate a protected document.
Figure 14:
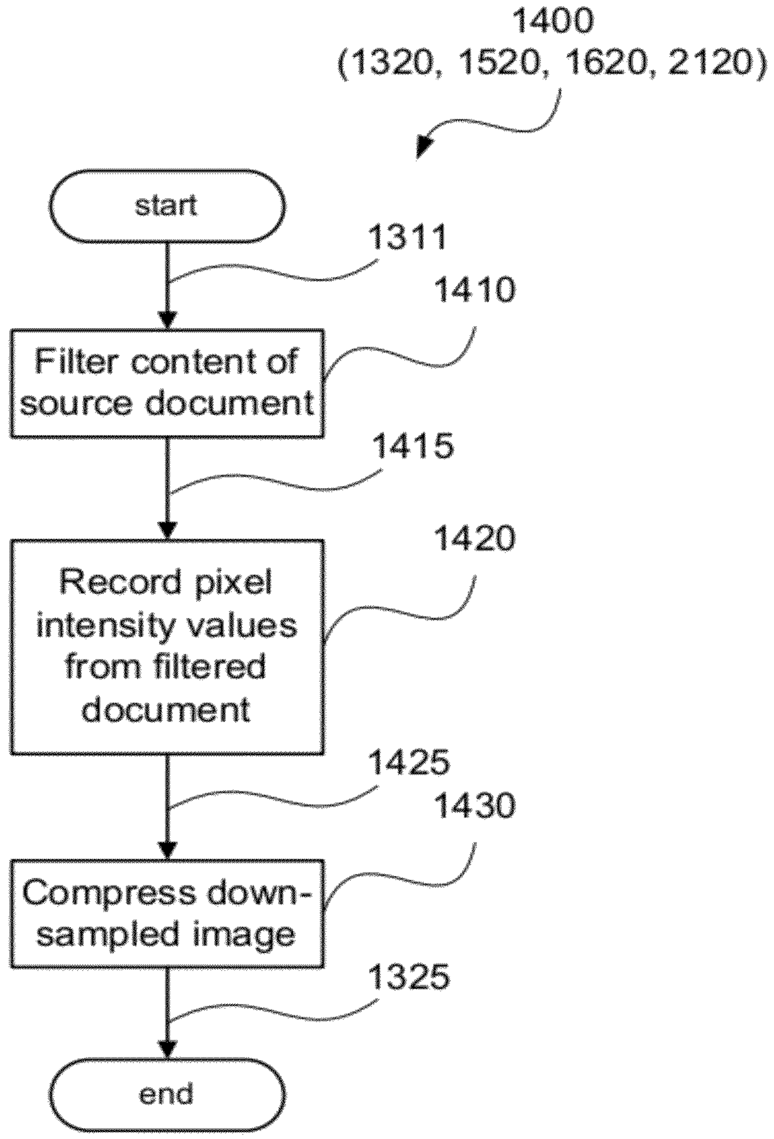
FIG. 14 is a schematic flow diagram showing a method of encoding content of the source document, as executed in the method illustrated in FIG. 13.

A method 1300 of encoding an electronic source document 1310 in order to generate a protected document 1350 will now be described with reference to FIG. 13. The method 1300 may be implemented as software resident on the storage device 1209 and being controlled in its execution by the processor 1205. As seen in FIG. 13, the source document 1310 contains content 1311 in digital form, such as pixel data generated from a digital document, or as output of a scanning process. The source document 1310 may be generated by scanning a printed version of the source document 1310, for example, using the scanning function 1210*b* of the device 1201. The source document 1310 in such a form may be stored in the RAM 1270.

Figure 23:
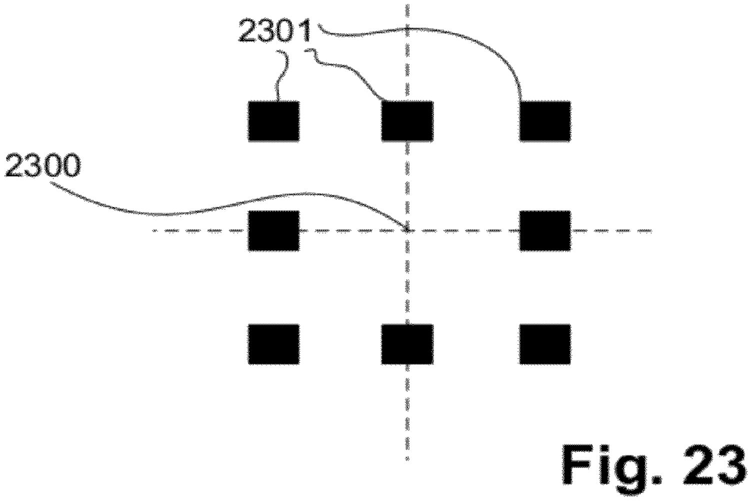
FIG. 23 illustrates an exemplary barcode encoding scheme.

In the method 1300 of FIG. 13, a protected document 1350 containing a barcode 1351 is generated. In the example of FIG. 13, the barcode 1351 is a two-dimensional (2D) barcode consisting of barcode elements in the form of small dots distributed across the entire page of the protected document 1350. Alternatively, the barcode 1351 may be formed of other types of barcode elements including lines, glyphs, or other marks. In one implementation, as seen in FIG. 23, the barcode elements are square dots 2301 and the barcode 1351 consists of the dots modulated spatially about nominal grid positions 2300. The distance and orientation of each dot relative to its nominal grid position is used to encode data. The barcode generated in accordance with the described methods may alternatively be one-dimensional.

The method 1300 begins at an encoding step 1320, where the processor 1205 retrieves the source document 1310 from the memory 1270 and encodes the content 1311 from the source document 1310 to form an encoded representation 1325 of the content 1311. The processor 1205 may also encode auxiliary information relating to the source document 1310 at step 1320. Such other information may include document creation data, document workflow permissions and document authorship. The processor 1205 encodes the content 1311 so that the content 1311 is suitable for embedding into the barcode 1351. Alignment data can be encoded into the generated barcode so that the encoded representation 1325 of all content and associated source document data can be aligned with the protected document 1350 during a later decoding process. A method 1400 of encoding the content, as executed at step 1320, will be described in detail with reference to FIG. 14.

The method 1400 may be implemented as software resident on the storage module 1209 and being controlled in its execution by the processor 1205. The method 1400 generates the encoded representation 1325 of the content 1311 from the source document 1310. The method 1400 begins at a low-pass filtering step 1410, where the processor 1205 blurs the content 1311 from the source document 1310 with a two-dimensional Gaussian blur kernel, thus forming a blurred document 1415 in preparation for a down-sampling operation. One such blur kernel has vertical and horizontal dimensions of thirty-two (32) pixels for an input image of the source document 1310 with resolution of six hundred (600) dots per inch. The step 1410 may also use other types of filtering such as band-pass filtering or adaptive filtering.

At a next sampling step 1420, the processor 1205 records pixel intensity values from the blurred document 1415 at equidistant intervals of sixteen (16) pixels to generate a down-sampled image 1425. The down-sampled image may be stored in the RAM 1270. Alternatively, pixels of the blurred document are summed in equally spaced, overlapping cell areas. Structure information may then be extracted from these equally spaced cells to generate the down-sampled image.

The method 1400 concludes at a compression step 1430, where the processor 1205 reduces the size of the down-sampled image 1425 using any lossy or lossless compression algorithm, optionally with error correction, to generate the encoded representation 1325 of the content 1311 from the source document 1310.

Returning to FIG. 13, at barcode generation step 1330, the processor 1205 generates a barcode 1351 from the encoded representation 1325 of the content 1311. As described above, the barcode 1351 is a 2D barcode consisting of dots. Alternatively, the barcode 1351 may be a one-dimensional barcode. The barcode 1351 may consist of lines, dots, glyphs, or other marks. In the barcode generation step 1330, the values of the encoded representation 1325 are used to modulate barcode dots relative to the nominal grid about which they are to be arranged in the protected document 1350, thus forming the barcode 1351.

At compositing step 1340, the processor 1205 combines the barcode 1351 generated at step 1330 with the content 1311 of the source document 1310 to form the protected document 1350 comprising the content 1311 and the encoded barcode 1351. Accordingly, the protected document 1350 includes the content 1311 and the barcode 1351. As seen in FIG. 13, the generated barcode 1351 is overlaid on the source document 1310, such that the dots of the barcode 1351 cover the content 1311, in some instances obscuring the content 1311 slightly. In some cases the barcode 1351 need not be combined with the document content 1311 and step 1340 may be therefore be omitted. Such cases may apply where the barcode is to be imparted into the protected document in a specific (designated) location, such as a margin, where there is not intended to be any content.

The protected document 1350 may be distributed in digital form, via the network 1220, or manually in printed form. The document 1350 is protected in two ways. First, the barcode 1351 acts as a visible deterrent to tamper. Second, the barcode 1351 may be extracted and used to detect alteration of the protected document 1350 since the original source document 1310 was protected.

Figure 15:
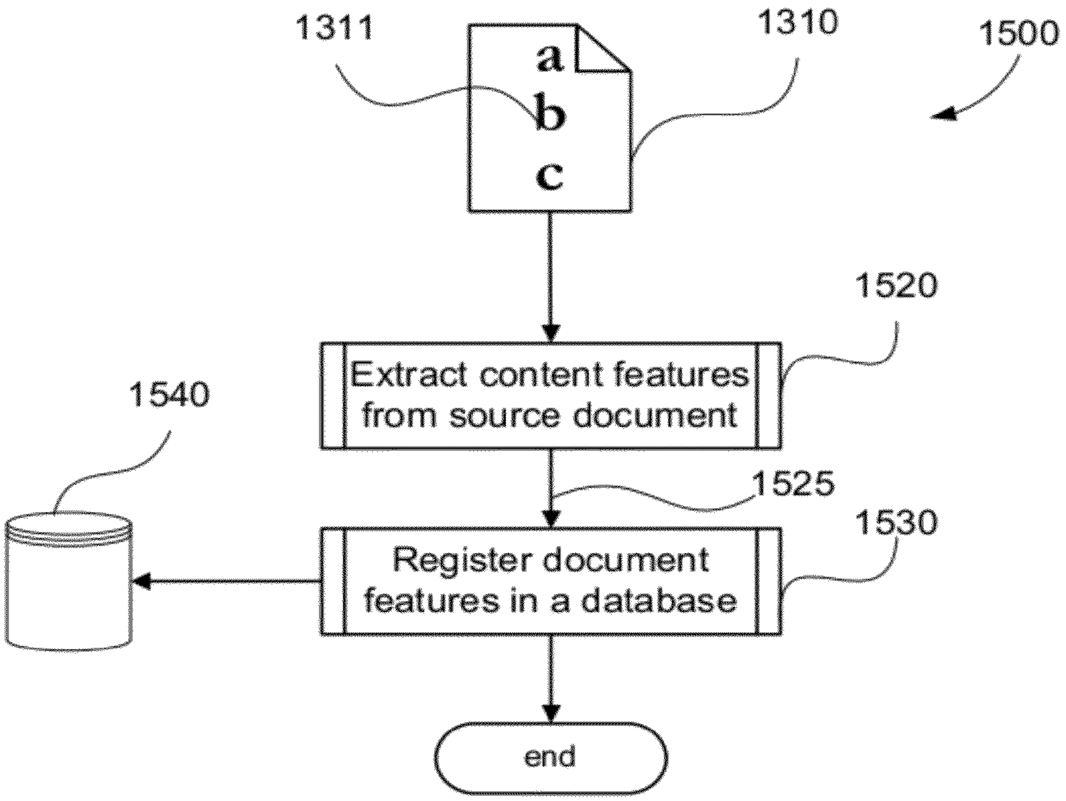
FIG. 15 is a schematic flow diagram showing a method of generating a barcode, as executed in the method illustrated in FIG. 13.

An alternative method of encoding a source document 1310 in order to detect future tampering will now be described with reference to FIG. 15. The method 1500 may be implemented as software resident on the storage device 1209 and being controlled in its execution by the processor 1205. As seen in FIG. 15, the source document 1310 contains content 1311 in digital form, such as pixel data generated from a digital document, or as output of a scanning process. The source document 1310 may be generated from scanning a printed version of the source document 1310, for example, using the device 1201. The source document 1310 in such a form may be stored in the RAM 1270.

In the method 1500 of FIG. 15, content features of the source document 1310 are extracted and are stored in a database 1540. The database may be queried at a later time to retrieve the content features of the source document 1310.

The method 1500 begins at encoding step 1520, where the processor 1205 extracts the content 1311 from the source document 1310 and encodes the extracted content features to form an encoded representation 1525 of the content 1311. The processor 1205 may also encode other information from the source document 1310 at step 1520. Such other information may include document creation data, document workflow permissions and document authorship. The processor 1205 encodes the content 1311 so that the content 1311 is suitable for registration into and subsequent retrieval from the database 1540. A method 1400 of encoding the content was described in a previous embodiment with reference to FIG. 14, and such is suitable as a method for encoding step 1520.

At registration step 1530, the encoded representation 1525 of the document content 1311 is added to the database 1540. The encoded representation 1525 forms a unique key for the source document 1310. Alternatively, a further identifier may be derived from metadata associated with the document 1310 and stored with the encoded representation 1525 in the database 1540. The database 1540 may reside in RAM 1270 of electronic device 1201 or may reside on another electronic device attached to communications network 1220.

Figure 16:
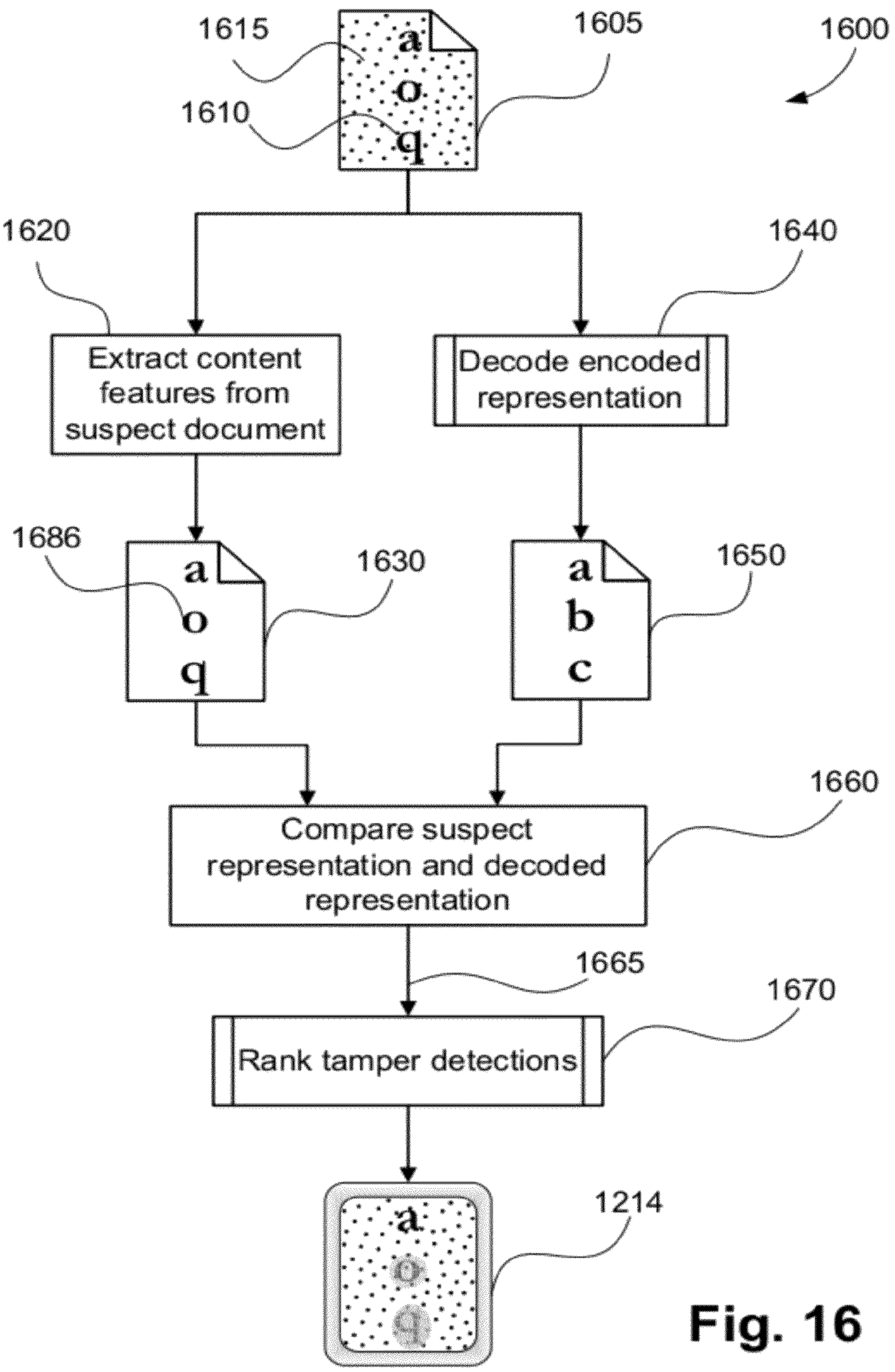
FIG. 16 is a schematic flow diagram showing a method of authenticating a printed document.

FIG. 16 is a schematic block diagram showing a method 1600 of authenticating a digital or printed document. The method 1600 will be described by way of example with reference to the candidate document 1605 which has the potential to contained tampered content. Again, the method 1600 may be implemented as one or more code modules of the software application program 1233 resident in the storage module 1209 and being controlled in its execution by the processor 1205.

In the example, the recipient of the candidate document 1605 comprising a barcode 1615 and content 1610 suspects that the candidate document 1605 has been tampered with and would like to verify the authenticity of the content 1610. As described above, the barcode 1615 comprises a plurality of barcode elements in the form of dots. The candidate document 1605 contains content 1610 in digital form, such as pixel data generated from a digital document, or as output of a scanning process. The candidate document 1605 may be generated by scanning a printed version of the candidate document 1605, for example, using scanning function 1210*b* of the device 1201. The protected document 1605 in such a form may be stored in the RAM 1270.

The method 1600 begins at barcode decoding step 1640, where the processor 1205 decodes from the barcode 1615 a decoded representation 1650. The decoded representation 1650 is a decompressed version of the encoded representation of the content (e.g. 1311) from a source document (e.g. 1310) which was encoded into the barcode 1615 (for example at step 1330 of FIG. 13). In this example, the decoded representation is seen to include the characters “a”, “b” and “c”.

Figure 17:
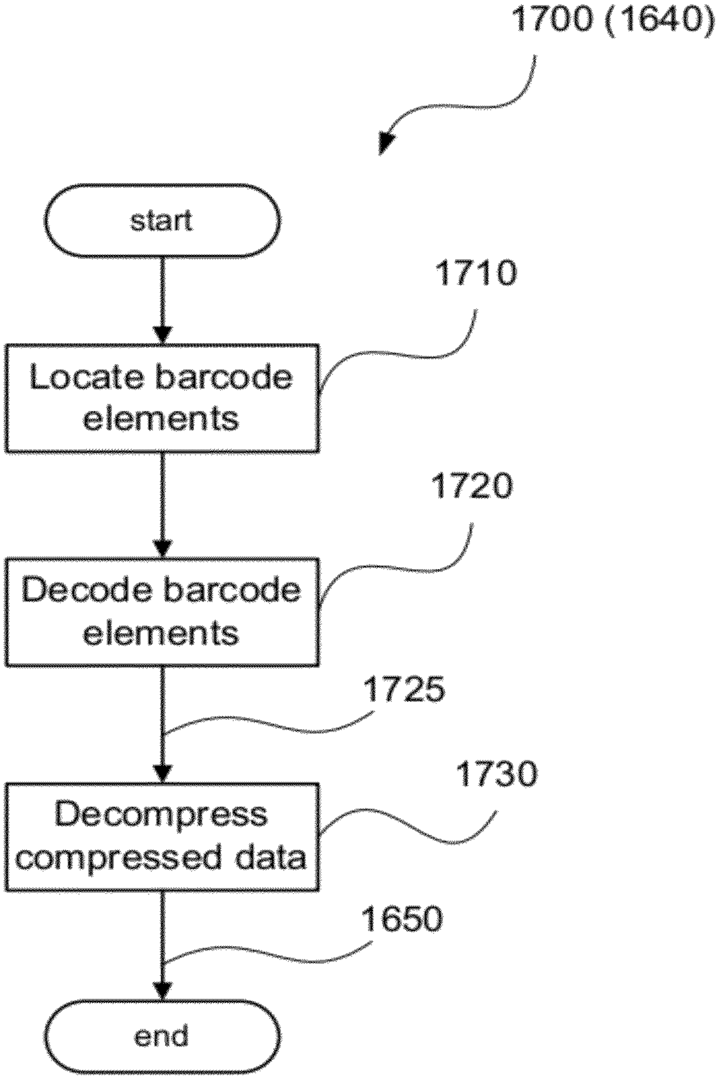
FIG. 17 is a schematic flow diagram showing a method of decoding a barcode, as executed in the method illustrated in FIG. 16.

A method 1700 of decoding the barcode, as executed at step 1640, is now described in detail with reference to FIG. 17. The method 1700 begins at barcode detection step 1710. The processor 1205 detects the plurality of barcode elements of the barcode 1615 in the image of the candidate document 1605. In particular, the processor 1205 determines a page location for at least a portion of the barcode elements of the barcode 1615, by iterating over pixels in the image, searching for pixel patterns that closely match prior knowledge of the form of the barcode 1615.

At a barcode decoding step 1720, the located elements of the barcode 1615 are demodulated to extract an encoded representation 1725 of the corresponding source content 1311. Specifically, the location of each small dot is determined relative to a regular grid. The distance, position and orientation of the determined relative location is converted into a single number and stored in RAM 1270. This process is repeated for each of the located barcode elements.

At decompression step 1730, the encoded representation data 1725 stored in RAM 1270 is transformed into a domain that allows comparison with another document representation. Typically, a lossy or lossless decompression is performed, optionally with error correction, to obtain a low-resolution image, referred to as decoded representation 1650, seen in FIG. 16.

Returning to FIG. 16, at a content extraction step 1620, the processor 1205 extracts content 1610 from the candidate document 1350 to form a suspect representation 1630 of the content 1610. As seen in FIG. 16, the extracted content in the suspect representation 1630 comprises the characters “a”, “o” and “q”. In step 1620, the processor 1205 performs a similar function to the encoding step 1320, and may be realised by the method 1400 described in FIG. 14. Step 1620 may also provide an alignment function to align the suspect content 1610 with the decoded representation 1650 using alignment information from the barcode 1615. Step 1620 may also provide a content separation function to separate the barcode elements from the content 1610 by masking out the locations of the barcode elements from the scanned image of the candidate document 1605, leaving just the content image. In the case where the barcode elements are small dots, the filtering step 1410 of the method 1400 may be used to substantially remove the barcode elements. The compression step 1430 of the method 1400 may be omitted if a comparison step 1660 with the decoded representation 1650, to be now described, is to be performed in an image domain.

The method 1600 continues at the comparison step 1660, where the processor 1205 compares the suspect representation 1630 with the decoded representation 1650, in order to authenticate the candidate document 1350. In particular, at step 1660, the processor 1205 performs a difference operation between the suspect representation 1630 and the decoded representation 1650, outputting a two-dimensional indication of tamper, referred to as a tamper map 1665. In this example, differences are identified in the tamper map 1665 corresponding to the mis-matched character pairs "o" and "b", and "q" and "c". If the representations 1630 and 1650 are in an image domain then the difference is a pixel-wise subtraction. Accordingly, the comparison at step 1660 is a subtraction between pixel values of the document 1350 as represented by the suspect representation 1630 and pixel values of the document as represented by the decoded representation 1650.

If the suspect representation 1630 and the decoded representation 1650 are in a compressed or otherwise transformed domain, then the processor 1205 may need to decompress the suspect representation 1630 and the decoded representation 1650 locally to perform the comparison at step 1660.

The tamper map 1665 output from comparison step 1660 shows regions where tamper is likely to have occurred. Differences between the suspect representation 1630 and the decoded representation 1650 occur because of tamper, but also because of environmental noise introduced during printing, scanning, or digital manipulation of the candidate document 1350. Thus, not all detected tamper in the tamper map 1665 may represent true tamper. True tamper is deliberate addition, deletion, or alteration of the content 1311 of the protected document 1350, resulting in suspect content 1610. Conversely, detections due to environmental noise are referred to as false detections and are undesirable but difficult to avoid or identify.

At step 1670, the tamper map 1665 is analysed to determine indications of detected tamper, which are then ranked by their likelihood of being indications of true tamper. The tamper map typically consists of positive and negative pixel values (somewhat akin to the array of FIG. 10), with values furthest from zero in positive or negative direction being most indicative of tamper. The absolute value of the pixels in the tamper map 1665 may be taken in order to simplify further processing, although this is not assumed in the following discussion.

Figure 18:
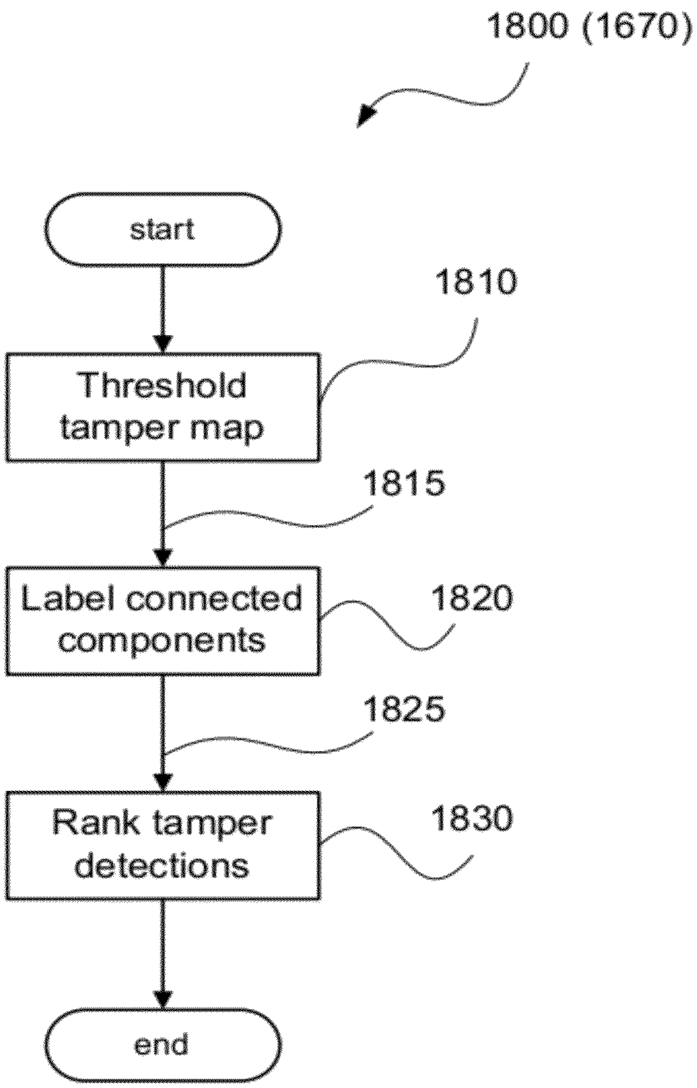
FIG. 18 is a schematic flow diagram showing a method of deriving tamper rank, as executed in the method illustrated in FIG. 16.

A method 1800 of deriving tamper rank, as executed at step 1670, will be described in detail with reference to FIG. 18. The method 1800 is also preferably implemented by software executable by the processor 1205 and begins at thresholding step 1810 which implements the processes discussed above. In an alternative implementation of step 1810 all pixel values in the tamper map below a predetermined positive threshold and above a predetermined negative threshold (i.e. pixels between the positive and negative thresholds) are set to zero. Note that this alternative technique is different to a standard binary thresholding technique used merely to identify tamper, in that the pixel values above the positive threshold and the pixel values below the negative threshold are not modified. Thresholding identifies areas of greatest difference between the representations 1630 and 1650. Such areas are referred to as tamper detections 1815. At step 1820, connected component analysis (CCA) is used to label or identify 1825 the tamper detections 1815. A further processing step (not illustrated) may be added to merge tamper detections that are close to one another. At a ranking step 1830, processor 1205 sorts the labelled tamper detections 1825 by their likelihood of being true tamper. The likelihood associated with each tamper detection is a function of the pixel values of the tamper detection in the thresholded tamper map 1815. Specifically, the likelihood is determined by ALU 1252 as the sum of all squared pixel values in the tamper detection. This sum of squares takes into account both the number of pixels and the magnitude of all pixel values in the tamper detection, with greater pixel values more heavily weighted. The tamper detection labels and ranks may be stored in a table in RAM 1270.

Returning to FIG. 16, the ranked tamper detections from step 1670 (1830) are then displayed on the display 1214 such that tamper detections ranked with a higher likelihood or confidence are displayed more prominently than tamper detections ranked with a lower likelihood or confidence, thereby visually distinguishing the instances of tamper. An example of assessing and ranking confidence or likelihood of tamper is seen in the distribution 600 of FIG. 6. In this example, the outlier 630 can be examined to determine an absolute distance measure 640 between the outlier 630 and the corresponding upper boundary threshold 610. In the example of FIG. 6, the outlier 630 would thus be ranked fourth ($4^{th}$) as potential tamper, as there are three other outliers immediately above and further distances away from the threshold 610. Two other outliers are also indicated whose corresponding absolute distances 650 and 660, in these cases from the lower boundary 620, may see those outliers roughly ranked, $30^{th}$ and $20^{th}$.

Returning to FIG. 16, the display 1214 displays a representation of candidate document 1350 overlaid with indications of tamper detection, derived from the tamper map by the method 1800. In this example the characters "o" and "q" are highlighted by shading. The character "q" attracts darker shading than the character "o" because of a greater relative difference from the corresponding source characters "c" and "b" respectively.

Figure 20:
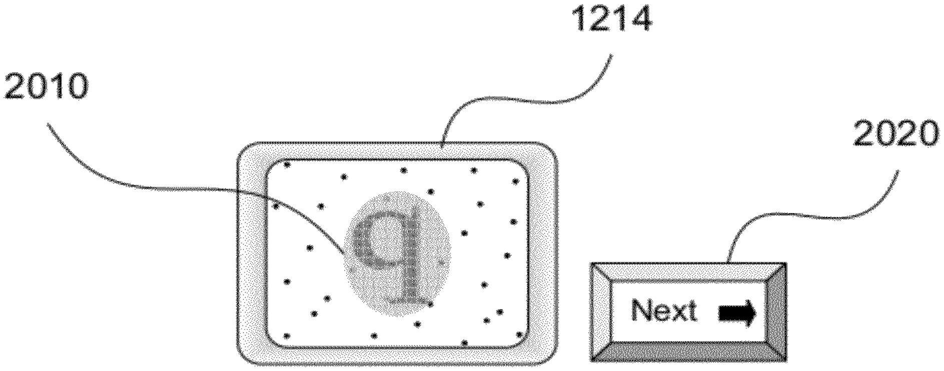
FIG. 20 illustrates a method of displaying tamper on a small display screen.

One approach to varying tamper prominence minimises the limiting characteristics of a small display screen that is typical of multi-function printing devices such as electronic device 1201. The approach is illustrated in FIG. 20. Typically tamper detection 2010 is displayed in the centre of the display 1214 with high magnification or zoom. A user can then select a graphical user interface "next" function 2020 via the user input device 1213 to refocus the display 1214 on the next most likely tamper, which is subsequently displayed with high magnification or zoom. This permits the user to traverse instances of potential tamper throughout the document. The traversal may jump from one location to the next in order of tamper likelihood. A slow panning operation between tamper detections may be used enhance the user's experience. An advantage of this display approach is that true detections of tamper are likely to be displayed first, while false detections are likely to be displayed later. This gives the user of the authentication device confidence that the system 199 is performing reliably, as well as saving the user time in performing the authentication. Another advantage of this display approach is that the user's attention is focused on only a small number of tamper detections at one time, allowing the user to evaluate and distinguish small tampers. A further advantage of displaying the document at high magnification is that the document is readable on a small display screen but the user does not have to read the whole document, just the tampers. A "previous" function, complementing the "next" function, may be provided to move from least likely tampers towards most likely tampers.

Figure 19:
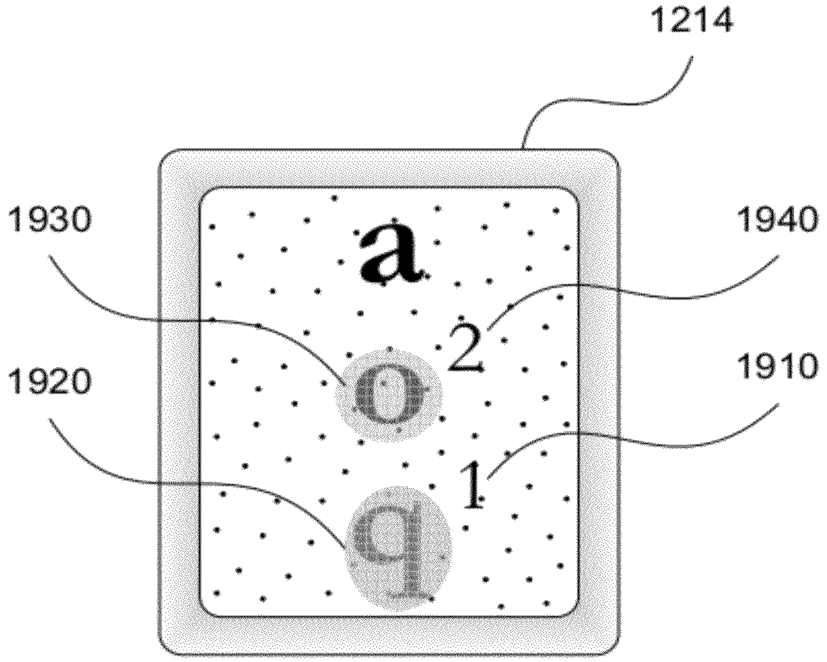
FIG. 19 illustrates a display screen displaying instances of tamper.

Another approach for varying tamper prominence is illustrated in FIG. 19. Again, display 1214 displays a representation of candidate document 1350 overlaid with indications of tamper detection. The most likely tamper detection 1920 is highlighted with a saturated red colour and a number ("1") 1910 is overlaid on the display 1214, next to the tamper detection 1920. The next most likely tamper detection 1930 is displayed differently, in this case highlighted with a different colour, such as a less saturated red, and a number ("2") 1940 is overlaid on display 1214, adjacent to the tamper detection 1930. This highlighting gives greater prominence to potential tamper regions of higher confidence values. The numerals visual distinguish instances of tamper and their assessed relative magnitude of tamper, thus forming numerical strength indicators for tamper. This approach to representation of tamper prominence permits the sensitivity of the tamper detection system to be appreciated by the user. For example, if too many instances of tamper are represented, the system may be too sensitive and provide for user input to adjust the relevant thresholds. Similarly, if none or only a few tampers are presented, the system may be too insensitive, necessitating a lowering of the thresholds. False positive and false negatives may be accommodated by varying the separation between the upper and lower bound thresholds.

Further approaches to varying tamper prominence involve displaying tampers with different colours, shading, saturation, flashing, outlines, highlights, or backgrounds.

Figure 21:
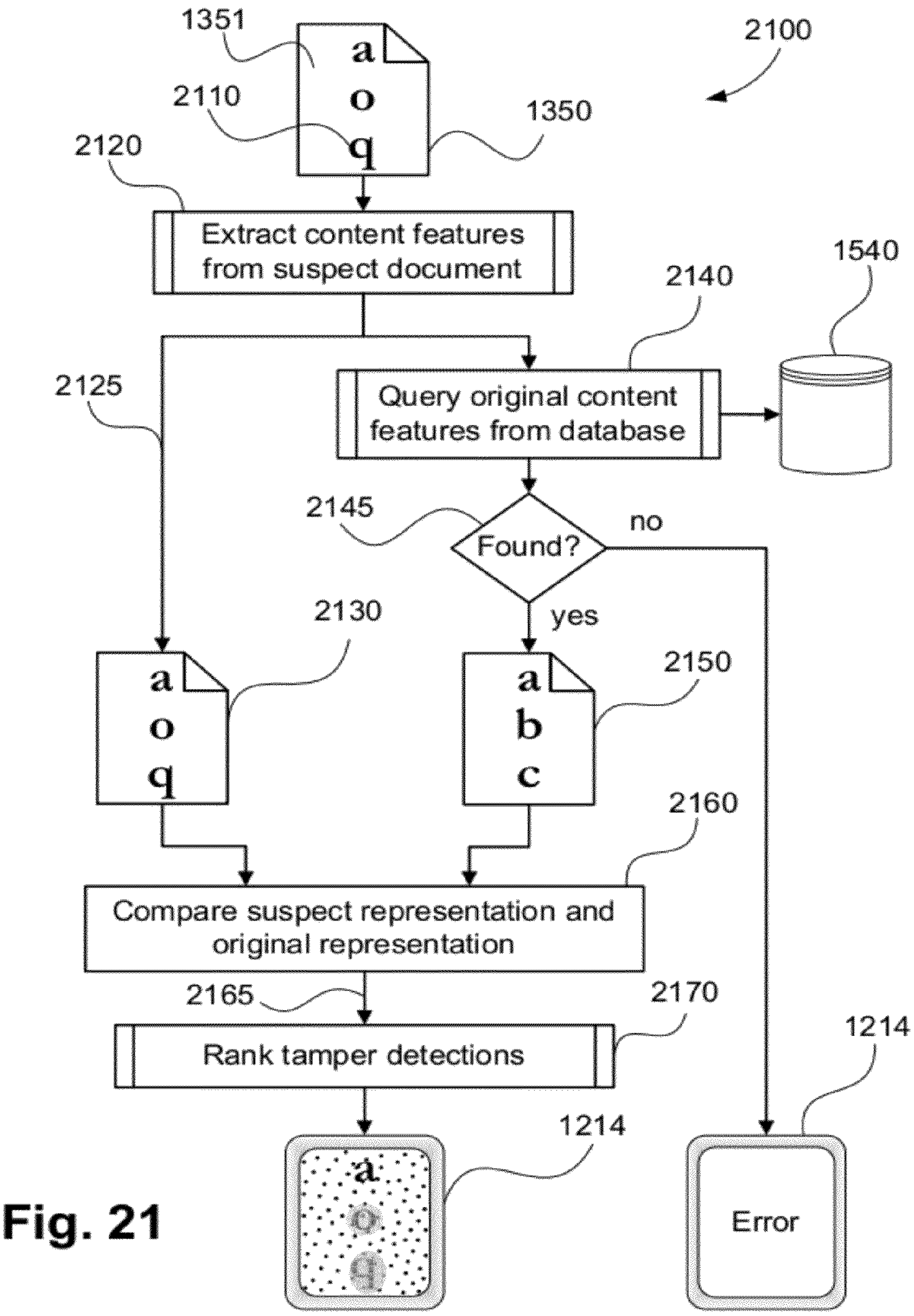
FIG. 21 is a schematic block diagram showing an alternative method of authenticating a digital or printed document.
Figure 22:
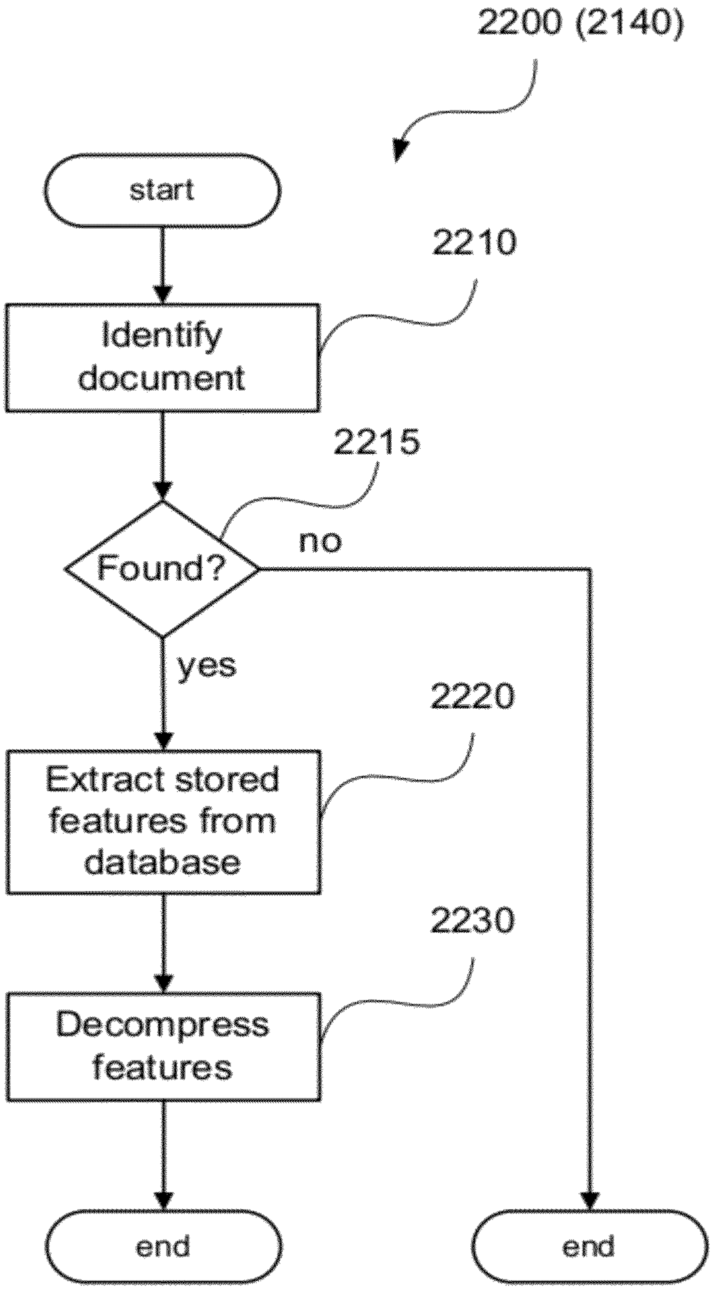
FIG. 22 is a schematic flow diagram showing a method of querying a database 1540, as executed in the method illustrated in FIG. 21.

FIG. 21 is a schematic block diagram showing another method 2100 of authenticating a digital or printed document and detecting potential tamper. The method 2100 will be described by way of example with reference to the candidate document 1350, previously discussed. Again, the method 2100 may be implemented as one or more code modules of the software application program 1233 resident in the storage module 1209 and being controlled in its execution by the processor 1205.

In the example, the recipient of the candidate document 1350, comprising content 2110, suspects that the candidate document 1350 has been tampered with and would like to verify the authenticity of the content 2110. The candidate document 1350 may have been previously registered in the database 1540 according to method 1500 described in FIG. 15. If the candidate document 1350 has been distributed in printed form, the candidate document 1350 is digitised by device 1201 using the scanning function to generate a scanned image of the candidate document 1350. The scanned image of the candidate document 1350 may be referred to as a representation of the candidate document 1350. The scanned image may be stored in the RAM 1270. If the candidate document 1350 has been distributed in digital form then the digitising step is omitted.

The method 2100 begins at a content extraction step 2120, where the suspect content 2110 is extracted from the document 1350 and transformed into an encoded representation 2125 that allows the content 2110 to be compared with the encoded representations of other documents. In step 2120, the processor 1205 performs a similar function to encoding step 1520, and may be realised by the method 1400 described in FIG. 14. The compression step 1430 of the method 1400 may be omitted if comparisons with other document representation are to be performed in an image domain.

At database query step 2140, the database 1540 is queried to identify the record that most closely matches the encoded representation 2125 of the suspect content 1351. A method 2200 of querying the database 1540, as executed at step 2140, will now be described in detail with reference to FIG. 22. The method 2200 begins at document identification step 2210, which desirably finds the record for the source document 1310 corresponding to candidate document 1350, that was added to the database during registration step 1530 illustrated in FIG. 4. The records retrieved from the database 1540 are compared at step 2215 with the extracted content of the candidate document 1350 to identify the nearest matching record.

Alternatively, database query step 2140 may rely on metadata associated with the candidate document 1350, such as a small barcode or other identifier, to retrieve the nearest matching record from database 1540.

If no matching record is found in the database 1540, then the method 2200 terminates at step 2240 causing the method 2100 to similarly terminate via step 2145 by which an error or warning message is displayed to the user, utilising display 1214, as seen in FIG. 21. If the document identification step 2210 is unable to disambiguate two or more matching records, then a user may be given a choice of multiple records to use for authentication comparison.

Once the nearest matching record has been found ("yes" from step 2215), content features representing the source document content 1311 are retrieved from database 1540 at step 2220. Optionally, the content features are decompressed at step 2230 using the counterpart to the lossless or lossy algorithm that compressed the content features 1311 in step 1430. The method 2200 then terminates at step 2250 via which the extracted features of the matching database record becomes the original representation 2150 of FIG. 21.

Typically, either the content extraction step 2120 or query step 2140, will allow for differences in rotation, scale, or translation between the matching database record and the extracted content.

The method 2100 continues at comparison step 2160, where the processor 1205 performs the step of comparing the suspect representation 2130 with the located original representation 2150, in order to authenticate the candidate document 1350. A comparison step 2160 is then performed between the documents 2130 and 2150 and is substantially similar to the comparison step 1660 described above with reference to FIG. 16.

At step 2170, a tamper map 2165 output from comparison step 2160 is analysed to determine indications of detected tamper, which are then ranked by their likelihood of being indications of true tamper. The ranking step 2170 is substantially similar to the ranking step 1670 described above.

Ranked tamper detections are then displayed with varying prominence, according to the arrangements previously described with reference to FIG. 16, FIG. 19, and FIG. 20.

INDUSTRIAL APPLICABILITY

The arrangements described are applicable to the computer and data processing industries and particularly for the authentication of hard copy documents.

The foregoing describes only some embodiments of the present invention, and modifications and/or changes can be made thereto without departing from the scope and spirit of the invention, the embodiments being illustrative and not restrictive.

We claim:

1. A computer-implemented method for identifying potential tamper in a candidate document having content affected by noise, said method comprising:

determining a candidate content value for each of a plurality of sub-regions of the candidate document and accessing an original content value for each of a plurality of sub-regions of a corresponding original document, said candidate and original content values being determined based on at least one characteristic of the content in the respective sub-regions;

determining a distribution of the candidate content values by associating the candidate content values with the corresponding original content values;

characterising the noise in the candidate document by determining an expected content value range based on the spread of a selected part of the distribution of candidate content values; and identifying candidate content values outside the expected content value range as potential tamper.

2. A method according to claim 1, wherein the candidate document and the original document have a protected region and the protected region is partitioned into tiles and the method is performed upon at least one of the tiles.

3. A method according to claim 1, further comprising determining from the distribution upper and lower bounds of candidate content values to define noise thresholds characterising the noise in the candidate document and to establish the expected content value range.

4. A method according to claim 3, wherein the upper and lower bounds are determined using at least one of a mean and a variance of candidate content values.

5. A method according to claim 3, wherein the upper and lower bounds are determined using methods that are robust to outlier candidate content values present in the distribution.

6. A method according to claim 5 wherein the bounds are determined using trimmed mean and trimmed variance of the candidate content values.

7. A method according to claim 5, wherein the bounds are determined using a probability distribution and through setting noise thresholds on a primary mode of the distribution.

8. A method according to claim 1, wherein the content values are mean pixel intensities of sub-regions of the respective documents.

9. A method according to claim 1, wherein the determining of the distribution comprises grouping the candidate content values according to one of:

(i) original content values;

(ii) spatial location; and (iii) a division of the protected region into subsections.

10. A method according to claim 3, wherein the upper and lower bounds are interpolated using regression based on specific upper and lower thresholds identified for corresponding specific original content values.

11. A method according to claim 10, wherein a specific upper threshold and a corresponding specific lower threshold are identified from a probability distribution of candidate content values associated with a corresponding specific original content value.

12. A method according to claim 3, further comprising adjusting a sensitivity of the method by at least one of:

raising the upper bound and lowering the lower bound; and narrowing a separation between the upper bound and the lower bound.

13. A method according to claim 1, wherein the at least one characteristic comprises at least one of pixel intensity, pixel centre of mass, pixel intensity gradient, edge features of the document and frequency domain features.

14. A method according to claim 1 further comprising decoding original content values for the original document from an encoded representation formed on the candidate document.

15. A method according to claim 14 wherein the encoded representation comprises a barcode.

16. A method according to claim 1, further comprising extracting information from the candidate document and using the extracted information to query a database to retrieve a representation of an original document associated with the candidate document.

17. A method according to claim 10, wherein at least one of the upper and lower bounds obtained through regression is non-linear.

18. A method according to claim 1, further comprising displaying the identified potential tamper in the candidate document on a display screen by:

displaying the candidate document on the display screen;

comparing the original document with the candidate document to determine at least two candidate regions, each determined candidate region including detected tamper of the candidate document;

determining a confidence value associated with each determined candidate region, said confidence value defining the likelihood that the detected tamper in each candidate region is true tamper; and displaying on the display screen a representation of the detected tamper overlaid on the displayed candidate document whereby detected tamper in a first candidate region associated with a confidence value higher than that of a second candidate region is displayed different to the detected tamper in the second candidate region.

19. A method according to claim 18 further comprising displaying, associated with each representation of the detected tamper, a representation of a magnitude of tamper thereby visually distinguishing the various instances of tamper.

20. A method according to claim 19 wherein the representation of magnitude comprises displaying a numerical strength indicator adjacent the instance, the numeral representing an order of confidence of the tampers.

21. A method according to claim 19 wherein the representation of magnitude comprises varying display of the candidate document at the tamper by varying at least one of colour, colour saturation, shading, flashing, outline, highlight, and background.

22. A method according to claim 18, further comprising associating with the display of the candidate document a user interface permitting user traversal of the displayed candidate document through the instances of tamper.

23. A method according to claim 22 wherein the user traversal of the tampers is in an order of confidence associated with the individual instances.

24. A computer-implemented method for identifying potential tamper in a candidate document having content affected by noise and a barcode encoding original content values of the content, said method comprising:

determining a candidate content value for each of a plurality of sub-regions of the candidate document and decoding the barcode to access an original content value for each of a plurality of sub-regions of a corresponding original document, said candidate and original content values being determined based on at least one characteristic of the content in the respective sub-regions; and identifying potential tamper in at least one of the plurality of sub-regions of the candidate document based on a dynamically adjusted noise threshold, wherein the dynamically adjusted noise threshold for a first original content value is different to the dynamically adjusted noise threshold for a second different content value.

25. A non-transitory computer readable storage medium having a program recorded thereon, the program being executable by computer apparatus to identify potential tamper in a candidate document having content affected by noise, said program comprising:

code for determining a candidate content value for each of a plurality of sub-regions of the candidate document and accessing an original content value for each of a plurality of sub-regions of a corresponding original document, said candidate and original content values being determined based on at least one characteristic of the content in the respective sub-regions;

code for determining a distribution of the candidate content values by associating the candidate content values with the corresponding original content values;

code for characterising the noise in the candidate document by determining an expected content value range based on the spread of a selected part of the distribution of candidate content values; and code for identifying candidate content values outside the expected content value range as potential tamper.

26. Computer apparatus adapted to identify potential tamper in a candidate document having content affected by noise, said apparatus comprising:

a processor;

a display device coupled to the processor and configured to display the candidate document; and a memory coupled to the processor and storing the candidate document and a program executable by the processor, the program comprising:

code for determining a candidate content value for each of a plurality of sub-regions of the candidate document and accessing an original content value for each of a plurality of sub-regions of a corresponding original document, said candidate and original content values being determined based on at least one characteristic of the content in the respective sub-regions;

code for determining a distribution of the candidate content values by associating the candidate content values with the corresponding original content values;

code for characterising the noise in the candidate document by determining an expected content value range based on the spread of a selected part of the distribution of candidate content values; and code for identifying, on the displayed candidate document, candidate content values outside the expected content value range as potential tamper.

* * * * *